United States Patent
Opaits et al.

(10) Patent No.: US 10,132,290 B2
(45) Date of Patent: Nov. 20, 2018

(54) APPARATUS AND METHOD FOR AERODYNAMIC PERFORMANCE ENHANCEMENT OF A WIND TURBINE

(71) Applicant: General Electric Company, Schenectady, NY (US)

(72) Inventors: Dmitry Floryovych Opaits, Fremont, CA (US); Seyed Gholamali Saddoughi, Clifton Park, NY (US); Grover Andrew Bennett, Esperance, NY (US); Matthew Patrick Boespflug, Clifton Park, NY (US); Stephen Bertram Johnson, Greenville, SC (US); Peggy Lynn Baehmann, Glenville, NY (US); Fulton Jose Lopez, Clifton Park, NY (US); Daniel Jason Erno, Clifton Park, NY (US); Robert Michael Zirin, Marblehead, MA (US); Anurag Gupta, Manvel, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 412 days.

(21) Appl. No.: 14/887,381

(22) Filed: Oct. 20, 2015

(65) Prior Publication Data

US 2016/0040650 A1  Feb. 11, 2016

Related U.S. Application Data

(63) Continuation-in-part of application No. 13/537,520, filed on Jun. 29, 2012, now Pat. No. 9,194,363.

(51) Int. Cl.
*F03D 1/06* (2006.01)

(52) U.S. Cl.
CPC ......... *F03D 1/0625* (2013.01); *F03D 1/0691* (2013.01); *F05B 2240/12* (2013.01); *Y02E 10/721* (2013.01); *Y10T 29/49316* (2015.01)

(58) Field of Classification Search
CPC ......... F03D 1/04; F03D 1/0658; F03D 1/0691
See application file for complete search history.

(56) References Cited

U.S. PATENT DOCUMENTS

| 6,199,796 B1 * | 3/2001 | Reinhard | B64C 3/30 244/201 |
| 7,323,792 B2 | 1/2008 | Sohn | |

(Continued)

FOREIGN PATENT DOCUMENTS

| GB | 2466209 A | 6/2010 |
| WO | 2007057021 A1 | 5/2007 |

(Continued)

OTHER PUBLICATIONS

Ragheb, M., "Modern Wind Generators", Mitsubishi, pp. 1-84, Feb. 28, 2010.

(Continued)

*Primary Examiner* — Justin Seabe
(74) *Attorney, Agent, or Firm* — GE Global Patent Operation; Nitin Joshi

(57) ABSTRACT

A deployable aerodynamic component configured to be mounted to a wind turbine. The wind turbine includes at least one rotor blade. The deployable aerodynamic component configured to be positioned in front of an inner portion of the at least one rotor blade, and is structurally configured to cover a substantial portion of the inner portion of the at least one rotor blade in a wind direction during deployment of the deployable aerodynamic component and to allow the passage therethrough of an incoming wind when non-deployed. Further described is a wind turbine including the above-described deployable aerodynamic component and (Continued)

method for aerodynamic performance enhancement of an existing wind turbine, wherein the method includes mounting the above-described deployable aerodynamic component to a wind turbine.

18 Claims, 17 Drawing Sheets

(56) References Cited

U.S. PATENT DOCUMENTS

| | | | |
|---|---|---|---|
| 7,396,207 B2 * | 7/2008 | DeLong | F03D 1/0608 |
| | | | 415/4.3 |
| 7,399,162 B2 | 7/2008 | Williams | |
| 7,874,805 B2 | 1/2011 | Pedersen | |
| 7,938,623 B2 | 5/2011 | Cairo | |
| 8,021,121 B2 | 9/2011 | Mikkelsen et al. | |
| 8,240,995 B2 | 8/2012 | Santiago et al. | |
| 8,287,243 B2 | 10/2012 | Herr et al. | |
| 8,459,948 B2 | 6/2013 | Caraballoso et al. | |
| 8,647,050 B2 * | 2/2014 | Krietzman | F03D 1/04 |
| | | | 415/211.2 |
| 8,753,080 B2 * | 6/2014 | Morimoto | F03D 1/0658 |
| | | | 416/1 |
| 2009/0191064 A1 * | 7/2009 | Herr | F03D 80/00 |
| | | | 416/245 R |
| 2009/0274557 A1 | 11/2009 | Vasyl | |
| 2011/0229320 A1 | 9/2011 | Hancock et al. | |
| 2012/0141271 A1 | 6/2012 | Southwick | |

FOREIGN PATENT DOCUMENTS

| | | |
|---|---|---|
| WO | 2008091162 A1 | 7/2008 |
| WO | 2011106737 A1 | 9/2011 |

OTHER PUBLICATIONS

Rauch et al., "3D Numerical Simulation and Evaluation of the Air Flow Through Wind Turbine Rotors with Focus on the Hub Area", Springerlink, pp. 227-230, 2007.

* cited by examiner

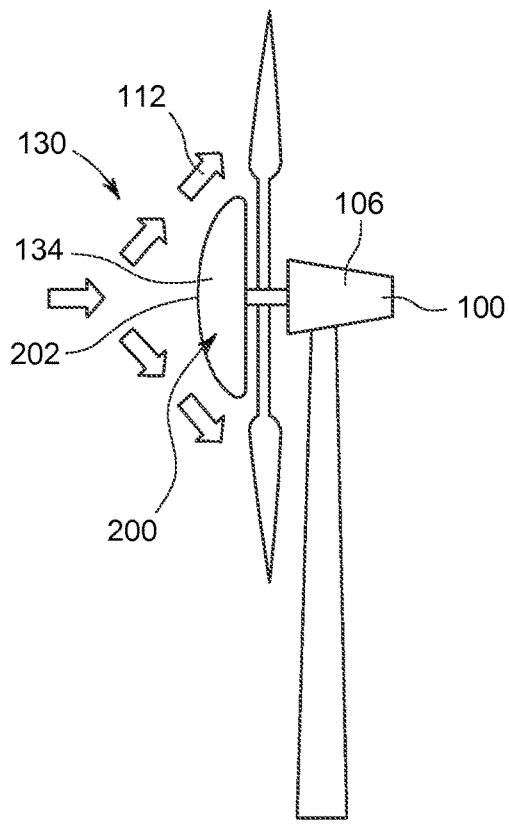
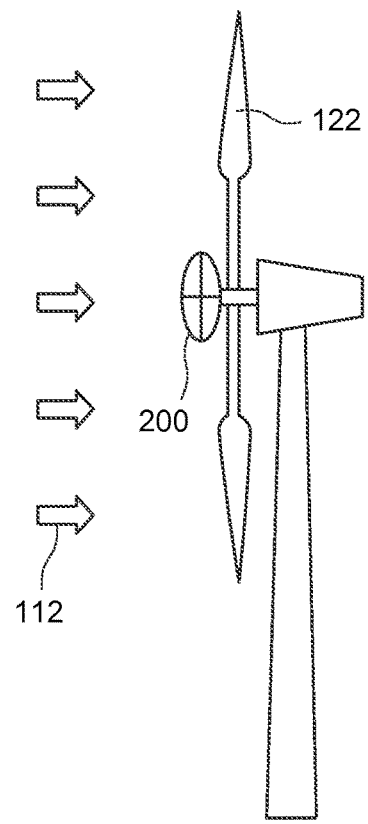
FIG. 12
FIG. 14
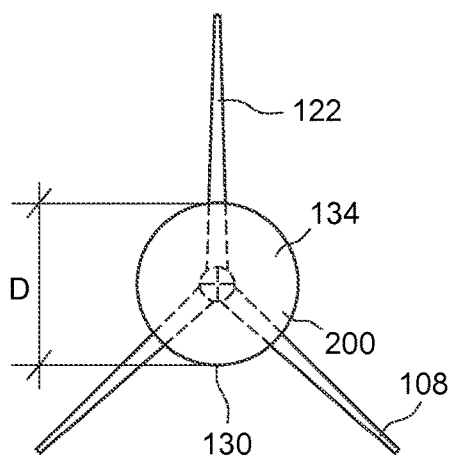
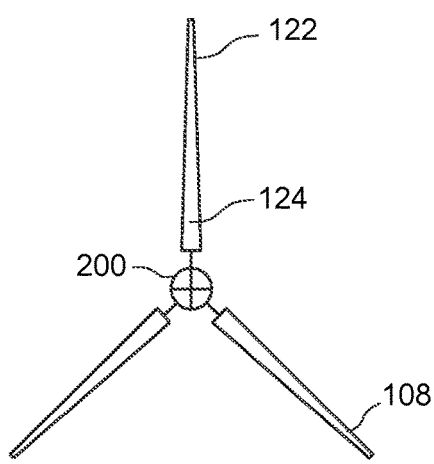
FIG. 13
FIG. 15

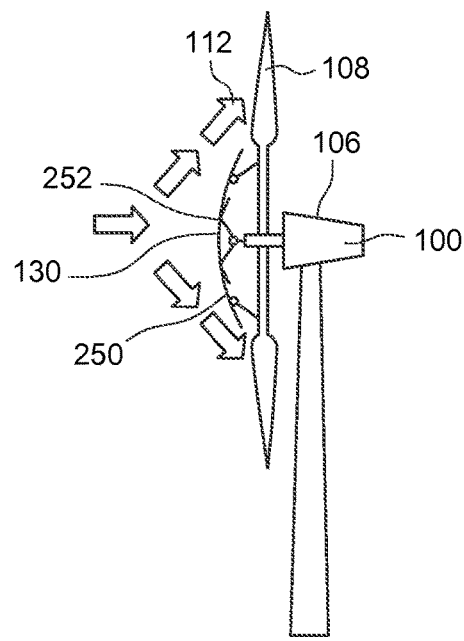
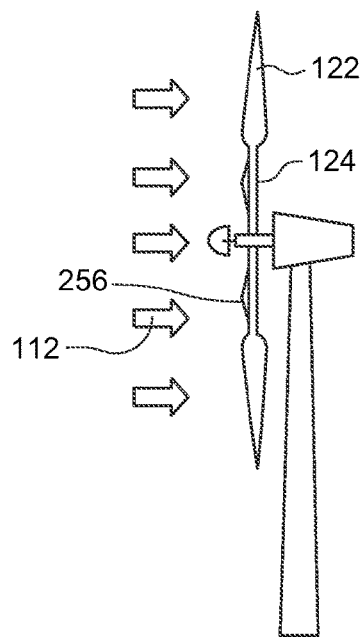
FIG. 21
FIG. 23
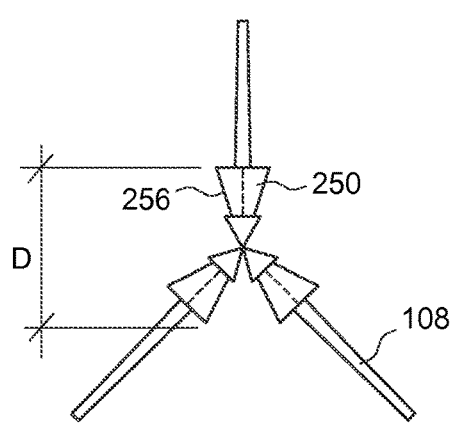
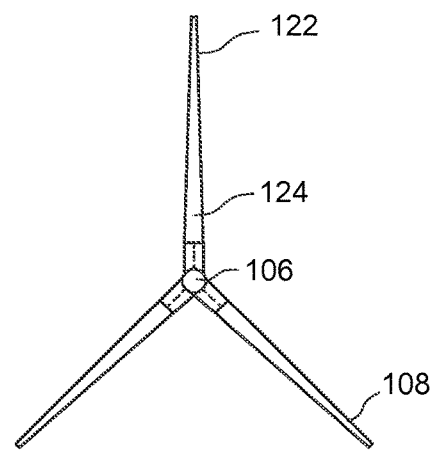
FIG. 22
FIG. 24

APPARATUS AND METHOD FOR AERODYNAMIC PERFORMANCE ENHANCEMENT OF A WIND TURBINE

BACKGROUND

Embodiments disclosed herein relate generally to apparatus and methods for increasing the aerodynamic efficiency of an existing wind turbine. In particular, embodiments disclosed herein relate to apparatus and methods that enable an acceleration of an airflow into more aerodynamically efficient region of a wind turbine rotor blade providing an increase in efficiency of an existing wind turbine.

Commonly, rotor blades of wind turbines do not possess an aerodynamic profile at the inner rotor section. More specifically, the air flow in the inner rotor portion may pass over the rotor of the wind turbine. Accordingly, root region torque extraction in wind turbines is typically low. Thus, not all kinetic energy of the wind passing an area that is swept by the rotor blades is used for the energy production. Accelerating the inboard section velocities and pushing the sped-up flow to outer span locations of the rotor blades will help increase the coefficient of power (Cp) of the blade.

Accordingly, there is a need for an improved wind turbine that provides for the acceleration of the flow into and over a more aerodynamically efficient region of the rotor blades.

BRIEF SUMMARY

These and other shortcomings of the prior art are addressed by the present disclosure, which provides an apparatus and method that enable an acceleration of an airflow into and over a more aerodynamically efficient region of a wind turbine rotor blade.

In accordance with an embodiment, provided is an aerodynamic component for a wind turbine configured to be mounted to said wind turbine, wherein at least one rotor blade is connected to a hub of said wind turbine and defines an inner portion and a profiled outer portion. The aerodynamic component comprising a front portion configured to be positioned in front of the inner portion of the at least one rotor blade of the wind turbine in operation. The aerodynamic component is structurally configured to: operate in a deployed state to redirect an incoming wind toward the profiled outer portion of the at least one rotor blade; operate in a non-deployed state to allow the incoming wind to pass therethrough toward the inner portion of the at least one rotor blade; and allow rotation of the at least one rotor blade about its longitudinal axis for pitch angle adjustment of the at least one rotor blade without interfering with the deployment of the aerodynamic component.

In accordance with another embodiment, provided is a wind turbine comprising: a hub; at least one rotor blade connected to the hub; and a deployable aerodynamic component configured to be mounted to the wind turbine. The deployable aerodynamic component comprising: a front portion configured to be positioned in front of the inner portion of the at least one rotor blade of the wind turbine in operation; wherein the deployable aerodynamic component is structurally configured to: operate in a deployed state to redirect an incoming wind toward the profiled outer portion of the at least one rotor blade; operate in a non-deployed state to allow the incoming wind to pass therethrough toward the inner portion of the at least one rotor blade; and allow rotation of the at least one rotor blade about its longitudinal axis for pitch angle adjustment of the at least one rotor blade without interfering with the deployment of the aerodynamic component. The rotor blade comprising an inner portion and a profiled outer portion.

In accordance with yet another embodiment, provided is a method for aerodynamic performance enhancement of a wind turbine comprising: providing a wind turbine including a hub and at least one rotor blade connected to the hub; mounting a deployable aerodynamic component to the wind turbine; determining the presence of winds exceeding preset parameters; deploying the deployable aerodynamic component to redirect an incoming wind toward the profiled outer portion of the at least one rotor blade when winds do not exceed the present parameters and operating the deployable aerodynamic component in a non-deployed state to allow the incoming wind to pass therethrough toward the inner portion of the at least one rotor blade when winds exceed the present parameters; and rotating the at least one rotor blade about its longitudinal axis to generate energy. The at least one rotor blade having an inner portion and a profiled outer portion.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein

FIG. 12 is a side view of a wind turbine including a deployable aerodynamic component according to an embodiment in a deployed state in accordance with one or more embodiments shown or described herein;

FIG. 13 is a front view of the wind turbine including the deployable aerodynamic component of FIG. 12 in a deployed state in accordance with one or more embodiments shown or described herein;

FIG. 14 is a side view of a wind turbine including a deployable aerodynamic component of FIG. 12 in a non-deployed state in accordance with one or more embodiments shown or described herein;

FIG. 15 is a front view of the wind turbine including the deployable aerodynamic component of FIG. 12 in a non-deployed state in accordance with one or more embodiments shown or described herein;

FIG. 21 shows a side view of a wind turbine including a deployable aerodynamic component in a deployed state in accordance with one or more embodiments shown or described herein;

FIG. 22 is a front view of the wind turbine including the deployable aerodynamic component of FIG. 21 in a deployed state in accordance with one or more embodiments shown or described herein;

FIG. 23 is a side view of the wind turbine including the deployable aerodynamic component of FIG. 21 in a non-deployed state in accordance with one or more embodiments shown or described herein;

FIG. 24 is a front view of the wind turbine including the deployable aerodynamic component of FIG. 21 in a non-deployed state in accordance with one or more embodiments shown or described herein;

DETAILED DESCRIPTION

The invention will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
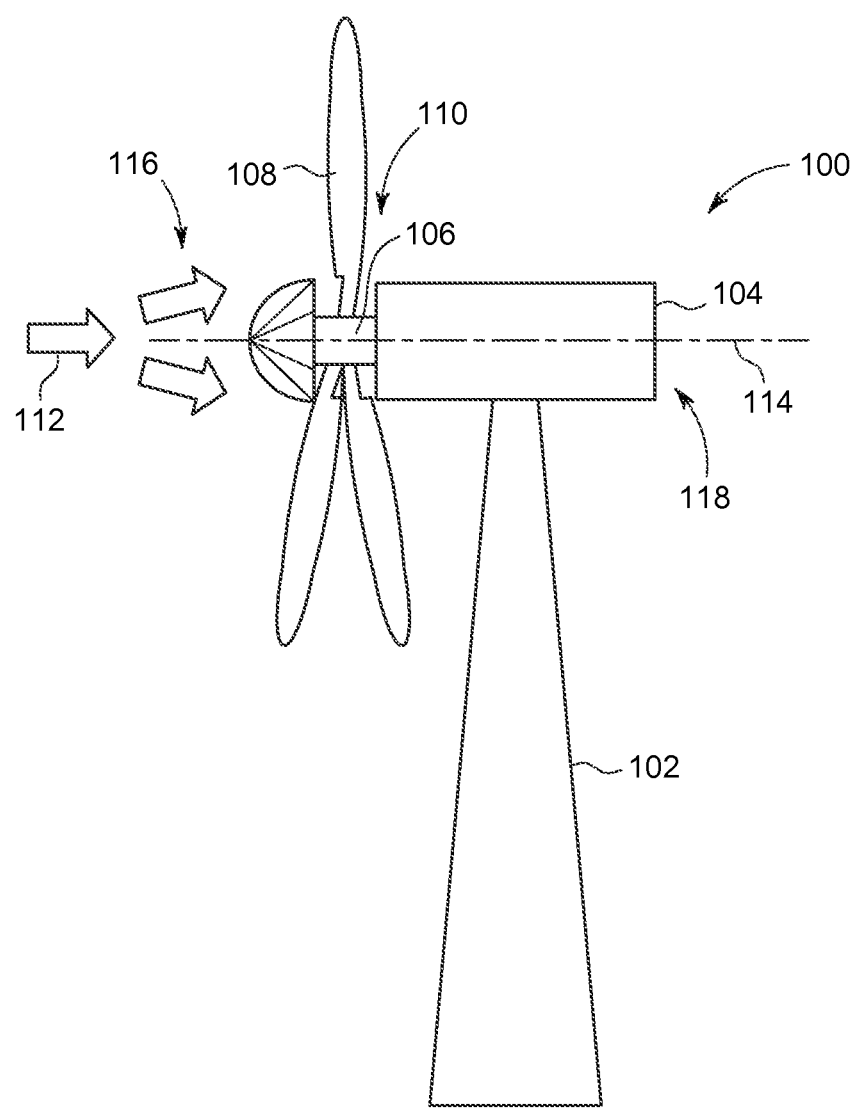
FIG. 1 is schematic side view of a wind turbine including a deployable aerodynamic component in a deployed state in accordance with one or more embodiments shown or described herein.

FIG. 1 shows a wind turbine 100. The wind turbine 100 includes a tower 102 onto which a nacelle 104 is arranged. Within the nacelle 104 a generator (not shown) for producing electrical current is placed. The generator is connected to a hub 106 with a substantial horizontal shaft. A plurality of rotor blades 108 are coupled to the hub 106 and configured to rotate about an axis (horizontal or vertical) at a rate determined by the wind speed and the shape of the rotor blades 108. Typically the plurality of rotor blades 108 includes two or more rotor blades. The rotor blades 108 and the hub 106 form a rotor 110 of the wind turbine 100. In operation the wind, indicated by arrows 112, imparts a rotation on the rotor 110 due to an aerodynamic profile on the rotor blades 108. More specifically, in the illustrated embodiment, the rotor 110 turns around a substantially horizontal rotor axis 114, which is substantially parallel to the wind direction 112. The rotor 110 drives the generator, such that electrical energy is produced from the kinetic energy of the wind 112.

It should be noted that relative adjectives like in front, backward, behind and rear are defined with respect to the wind direction 112 related to a wind turbine 100 in operation, i.e. when the wind turbine 100 produces electrical energy. That means that the wind 112 flows from a front end 116 to a back end 118 of the wind turbine 100. In addition, the terms axial or radial relate to the rotor axis 114 of the hub 106, when the wind turbine 100 produces electrical energy. Thus, as described above, the rotor axis 114 is substantially parallel to the wind 112 direction.

Figure 2:
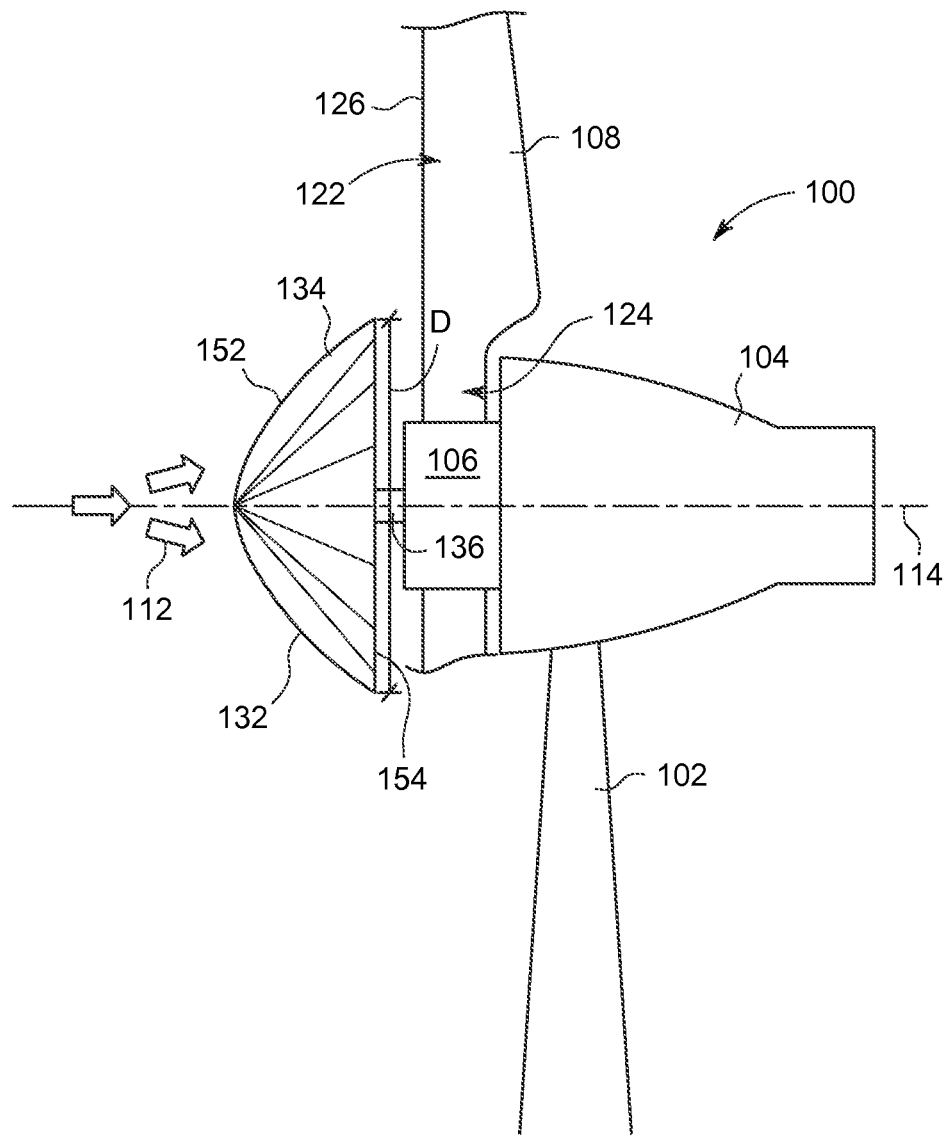
FIG. 2 is an enlarged schematic side view of the wind turbine including the deployable aerodynamic component of FIG. 1 in a deployed state in accordance with one or more embodiments shown or described herein.
Figure 3:
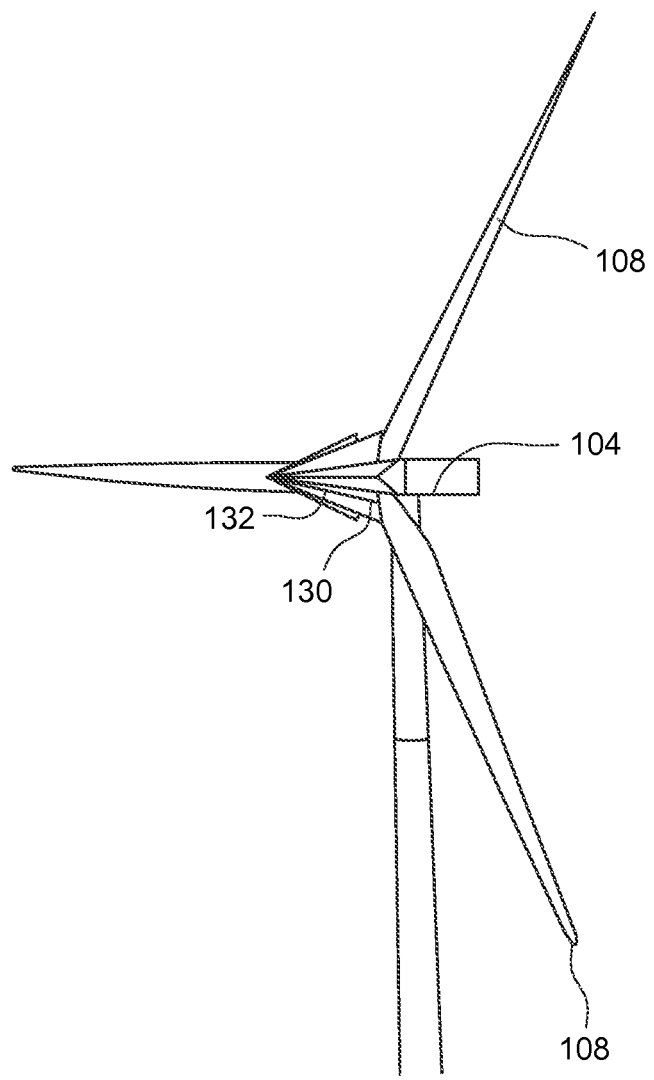
FIG. 3 is perspective view of the wind turbine including the deployable aerodynamic component of FIG. 1 in a non-deployed state in accordance with one or more embodiments shown or described herein.
Figure 4:
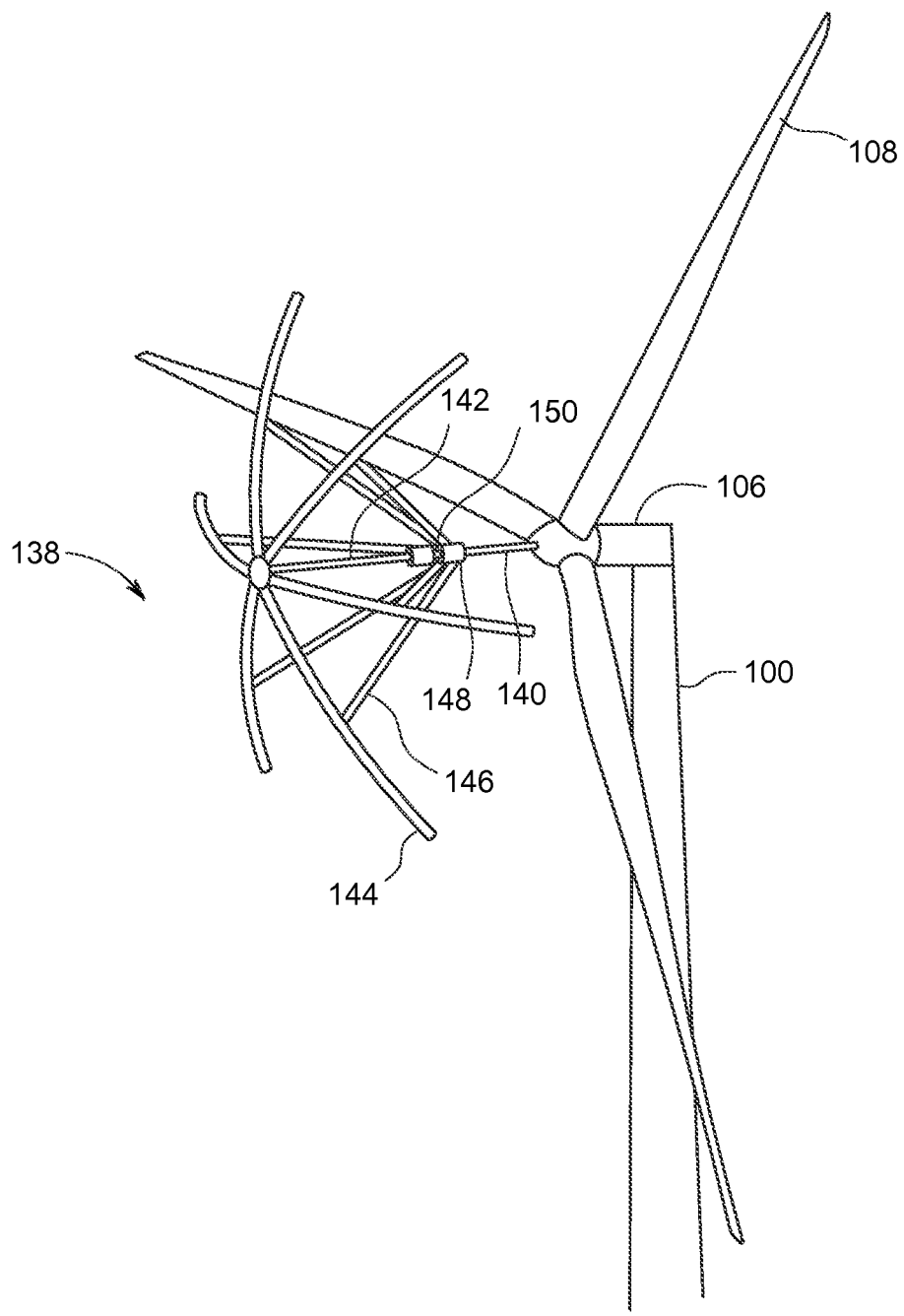
FIG. 4 is a perspective view the wind turbine including the deployable aerodynamic component underlying structure of FIG. 1 in accordance with one or more embodiments shown or described herein.

Referring again to the drawings wherein, as previously stated, identical reference numerals denote the same elements throughout the various views, FIGS. 2-4 depict in simplified schematic drawings, a wind turbine according to an embodiment. For the sake of simplicity, only a portion of the plurality of rotor blades 108 is shown. Each of the plurality of rotor blades 108 has an outer portion 122 and an inner portion 124. The terms "outer" and "inner" are used with respect to the hub 106. Therefore, the outer portion 122 of each of the plurality of rotor blades 108 is radially outside of the inner portion 124 in FIG. 2. The inner portion 124 of each of the plurality of rotor blades 108 is connected to the hub 106. Each rotor blade 108 may be, in a typical embodiment, turned around its longitudinal axis to adjust a pitch angle. For that purpose a pitch mechanism is located in the hub 106 and/or the nacelle 104 of the wind turbine 100. The outer portion 122 of each of the rotor blades 108 has a wing shaped profile, such that the outer portion may also be called profiled section or profiled outer portion 122 of the rotor blade 108. The front end of each of the plurality of rotor blades 108 is typically straight from the connection to the hub to the outer portion 122; in another typical embodiment of the present patent application the front end of each of the plurality of rotor blades 108 is typically straight to the blade tip of each of the rotor blades 108. Thus, a leading edge 126, i.e. the windward or front edge of each of the plurality of rotor blades 108, defines during operation of the wind turbine 100, i.e. when the hub 106 and the rotor blades 108 turn around the rotor axis 114, a substantially flat disk. Thus, the outer end of the inner portion 124, approximately where the profiled portion begins, i.e. where each of the rotor blades 108 start the leeward protrusion in the embodiment shown in FIG. 2 when looking from a hub sided end of the rotor blade 108 to the blade tip, is defining a circle around the rotor axis 114.

As illustrated in FIG. 2, in front, i.e. windward, of the rotor blades 108, a deployable aerodynamic component 130 according to an embodiment is symmetrically disposed with respect to the turning axis 114. In the illustrated embodiment, the deployable aerodynamic component 130 resembles an umbrella-like structure, and is thus referred to herein as an umbrella-like deployable aerodynamic component 132. The umbrella-like deployable aerodynamic component 132 defining a front portion 152 and a rear portion 154, and including a mechanically deployable support structure (described presently) and a skin-like covering 134. The skin-like covering may be comprised of a tensionable fabric, plastic, or any other suitable material capable of creating a flow blockage and redirecting the incoming wind 112 as described herein.

The umbrella-like deployable aerodynamic component 132 may be connected to the hub 106 via a shaft 136, or later connected to an existing small spinner (not shown) already mounted on the hub of the wind turbine 100. In the last case, the deployable aerodynamic component 130 covers the small spinner. Thus, the deployable aerodynamic component 130 may be a nose cone of the hub 106. The umbrella-like deployable aerodynamic component 132 is in a typical embodiment symmetrically placed with respect to the turning axis 114 when mounted on a wind turbine 100. The umbrella-like deployable aerodynamic component 132 when deployed may have a parabolic or semi-spherical outer shape as illustrated in FIG. 2, or any other shape capable of redirecting the airflow as indicated herein when deployed. When deployed, the umbrella-like deployable aerodynamic component 132 guides or redirects incoming wind 112 that is typically directed toward the hub 106 or to the nacelle 104 toward the profiled or outer portions 122 of each of the plurality of rotor blade 140. Thus, kinetic energy of the wind 112 directed toward the hub 106 is also capable of being transformed it to electrical energy.

In an embodiment, the umbrella-like deployable aerodynamic component 132 has a maximum outer diameter D in front of the rotor blades 108 that is corresponding substantially to a diameter of the circle defined by the outer end of the inner portion 124 in operation of the wind turbine 100. The maximum outer diameter D might also be slightly greater or smaller than the circle. Hence, the wind 112 directed to the hub 106 and the nacelle 1104 is directed along the umbrella-like deployable aerodynamic component 132 to the outer portion 122 of the rotor blades 108, as indicated by arrows 112. The aerodynamic shape of the umbrella-like deployable aerodynamic component 132 causes an acceleration in the flow of wind 112 over the more aerodynamically efficient regions of each of the plurality of blades 108.

FIG. 3 illustrates in a simplified schematic the deployable aerodynamic component 130, and more particularly the umbrella-like deployable aerodynamic component 132, when in a non-deployed state. More particularly, during a high wind occurrence, when loading/drag or thrust loads become too great for the umbrella-like deployable aerodynamic component 132 to withstand, the structure may be retracted to a non-deployed state. In an embodiment, the non-deployed state of the umbrella-like deployable aerodynamic component 132 resembles a typical umbrella-like folded structure as best illustrated in FIG. 3. The aerodynamic shape of the umbrella-like deployable aerodynamic component 132 when in the non-deployed state minimizes any blockage or redirecting of the flow of wind 112 and allows the wind 112 to flow toward the plurality of blades 108 as is typical. In an alternate embodiment, the skin-like structure 134 may be configured to detach from an underlying structure without an immediate requirement to retract the underlying structure.

The underlying structure for the umbrella-like deployable aerodynamic component 132 is best illustrated in FIG. 4. More particularly, illustrated is a support structure 138 for the umbrella-like deployable aerodynamic component 132 of FIGS. 2 and 3. The support structure 138 is illustrated having the skin-like covering 134 (FIG. 3) removed for simplicity of illustrating the support structure 138. In an embodiment, the support structure 138 is coupled to the shaft 136, or alternatively coupled to the hub 106 via an alternate means, such as a primary extension tube 140 configured as a part of the support structure 138. In an embodiment, the support structure 138 is further comprised of a secondary extension tube 142, a plurality of spreaders 144 configured to provide immediate support to the skin-like covering 134 and a plurality of secondary supports 146. The secondary extension tube 142 is slideably coupled to the primary extension tube 140 so as to provide adjustment of a clearance space between the umbrella-like deployable aerodynamic component 132 and the hub 106. The plurality of secondary supports 146 are coupled to the plurality of spreaders 144 and a support structure hub 150 through which the primary and secondary extension tubes 140, 142 extend. In an embodiment, a plurality of power heads 148 are provided proximate the support structure hub 150. The plurality of power heads 148 may provide slideable movement of the support structure hub 150, in a forward and aft direction, along the primary and/or the secondary tubes 140, 142, thus enabling deployment and retraction of the umbrella-like deployable aerodynamic component 132.

Figure 5:
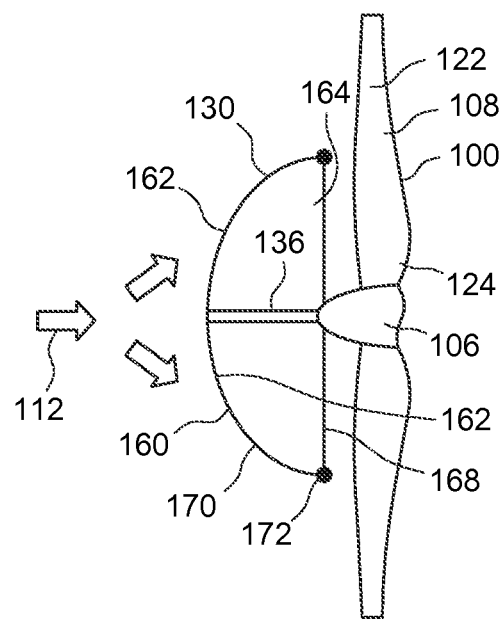
FIG. 5 is a side view of a wind turbine including a deployable aerodynamic component in a deployed state in accordance with one or more embodiments shown or described herein.
Figure 6:
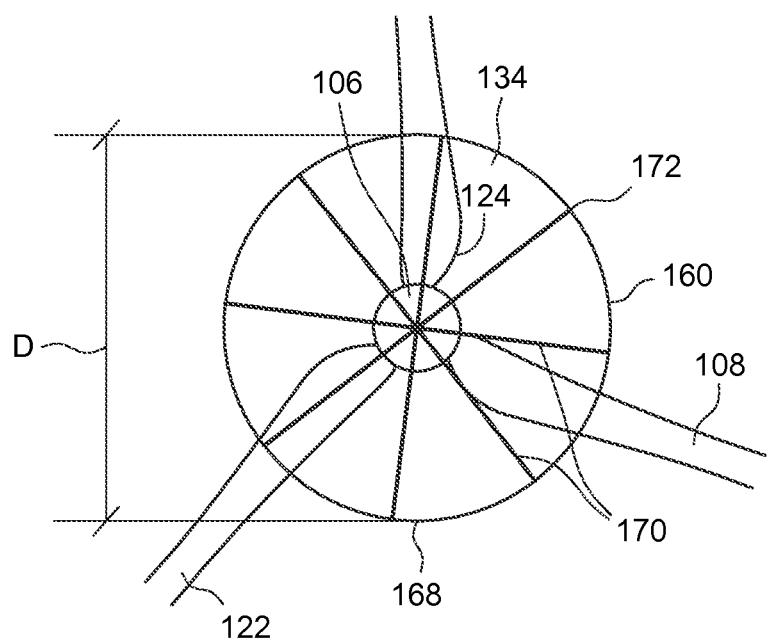
FIG. 6 is a front view of the wind turbine including the deployable aerodynamic component of FIG. 5 in accordance with one or more embodiments shown or described herein.
Figure 7:
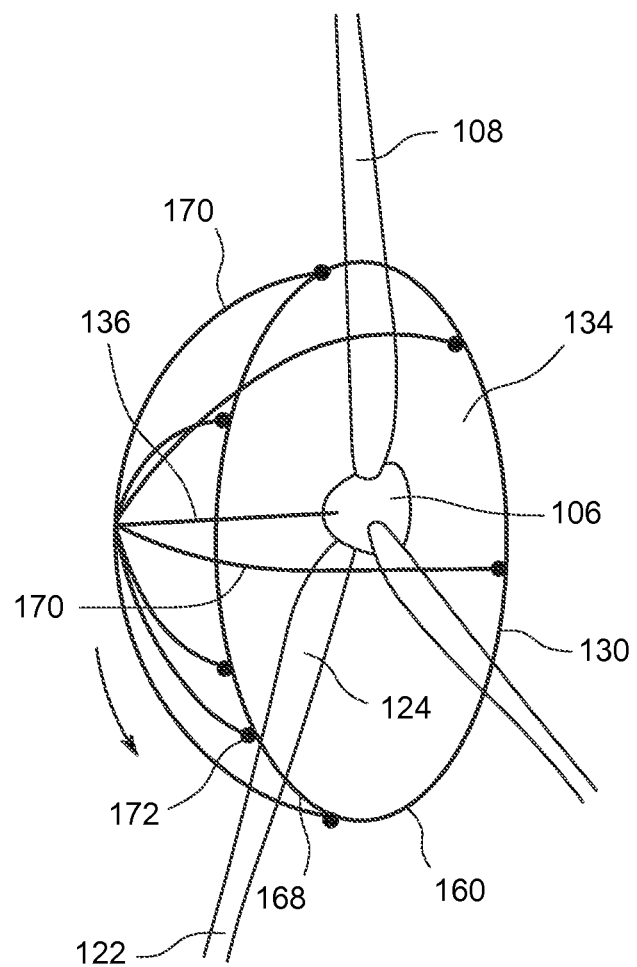
FIG. 7 is a perspective view of the wind turbine including the deployable aerodynamic component of FIG. 5 in a partially non-deployed state in accordance with one or more embodiments shown or described herein.

Referring now to FIGS. 5-7, in which like features are designated with the same reference numbers, illustrated is another embodiment of the deployable aerodynamic component 130 coupled to a wind turbine 100. The deployable aerodynamic component 130 according to FIGS. 5-7 is configured as a roller and support arc deployable aerodynamic component 160, and has a generally similar shape as the umbrella-like structure previously disclosed. In this particular embodiment, and as best illustrated in FIG. 5, the roller and support arc deployable aerodynamic component 160 is coupled to the wind turbine 100, and more particularly the hub 106 of the wind turbine 100, via a shaft 136, and defining a front portion 162 and a rear portion 164. The roller and support arc deployable aerodynamic component 160 when deployed is shaped similar to the deployable aerodynamic component 130, and more particularly the umbrella-like deployable aerodynamic component 132, described with respect to FIGS. 2-4. FIG. 6 shows a front view of an embodiment of the roller and support arc deployable aerodynamic component 160 with a substantially circular shape in a front view when in a deployed state. The roller and support arc deployable aerodynamic component 160 may have in this case a paraboloid shaped form or a form of a sphere segment when viewed in a side view. As it is shown in this embodiment, the inner portions 124 of each of the plurality of rotor blade 108 are completely covered in wind direction 112 when deployed. In some embodiments, only a substantial portion of the inner portions 124 might be covered by the roller and support arc deployable aerodynamic component 160 in direction of the wind 112. A substantial portion of the inner portion may be 50 to 100 percent, 75 to 100 percent, or 90 to 100 percent of a total length of the inner portion 124. The total length of the inner portion 124 is typically the distance from a connecting flange for connecting each of the rotor blades 108 to the hub 106 to the beginning of the airfoiled or profiled outer portion 122 of the rotor blade 108. In an embodiment, the roller and support arc deployable aerodynamic component 160 may have a maximal outer diameter D of about the diameter of the circle defined by the outer end of the inner portion 124 in operation of the wind turbine 100.

The rear portion 164 of the deployable aerodynamic component 130, and more particularly the roller and support arc deployable aerodynamic component 160 may have a substantially circular shape defined by a frame 168, about which a plurality of support arcs 170, each having a roller 172 coupled thereto the support arc 170 and the frame 168, are moveable. In an embodiment, the rear portion 164 may at least partially enclose the hub 106 of the wind turbine. The rear portion 164 of the roller and support arc deployable aerodynamic component 160 is formed such that the airfoiled shaped outer portion 122 of each of the plurality of rotor blades 108 is not touching in any pitch angle of the rotor blade 108 the rear portion 164 of the deployable aerodynamic component 130 Therefore, the deployable aerodynamic component 130 is adapted to provide a low air resistance and to guide the wind 112 toward the airfoiled shaped outer portion 122 of the rotor blades 108 when deployed.

The roller and support arc deployable aerodynamic component 160 further includes a skin-like covering 134, such as a tensionable fabric, supported by support arcs 170. In an embodiment, the skin-like covering 134 is configured to overlay the support arcs 170 and being coupled thereto to allow for deployment. In an alternate embodiment, the skin-like covering 134 is configured to extend between adjacent support arcs 170, being coupled thereto. The roller and support arc deployable aerodynamic component 160 is deployable via mechanical automation that provides for movement of the support arcs 170, via rollers 172, about the frame 168. When deployed, the roller and support arc deployable aerodynamic component 160 provides blockage and redirecting of the incoming wind 112 toward the outer portions 122 of each of the plurality of rotor blades 108, previously described. In addition, the aerodynamic shape of roller and support arc deployable aerodynamic component 160 causes an acceleration in the flow of wind 112 over the more aerodynamically efficient regions of each of the plurality of blades 108.

FIG. 7 illustrates in a simplified schematic view roller and support arc deployable aerodynamic component 160 during the process of deployment as the rollers 172 move about the frame 168. In a non-deployed state, such as during a high wind occurrence, when loading/drag or thrust loads become too great for roller and support arc deployable aerodynamic component 160 to withstand, the support arcs 170 may be moved about the frame 168 so as to stack one against another, and configured in a non-deployed state. The aerodynamic shape of roller and support arc deployable aerodynamic component 160 when in the non-deployed stated minimizes any blockage or redirecting of the flow of wind 112 and allows the wind 112 to flow toward the inner portion 124 of the plurality of blades 108 as is typical. In an alternate embodiment, the skin-like structure may be configured to detach from an underlying structure without an immediate requirement to move the support arcs 170 about the frame 168.

Figure 8:
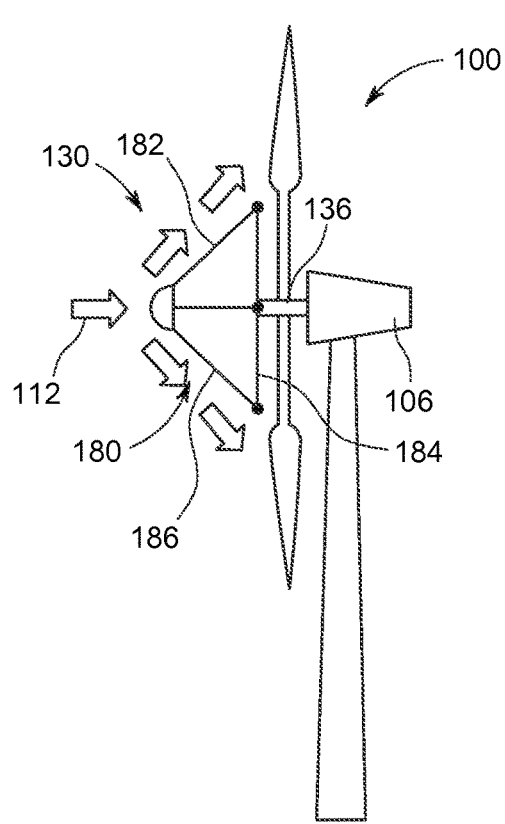
FIG. 8 is a side view of a wind turbine including a deployable aerodynamic component in a deployed state in accordance with one or more embodiments shown or described herein.
Figure 9:
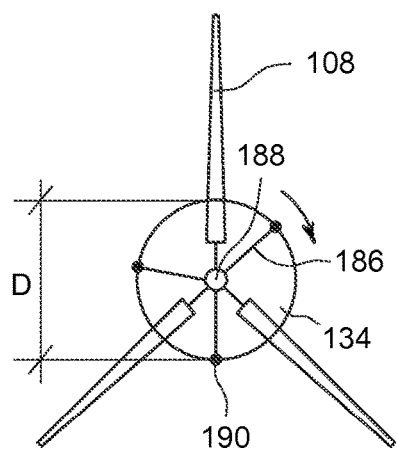
FIG. 9 is a front view of the wind turbine including the deployable aerodynamic component of FIG. 8 in a deployed state in accordance with one or more embodiments shown or described herein.

Referring now to FIGS. 8-11, in which like features are designated with the same reference numbers, illustrated is another embodiment of the deployable aerodynamic component 130 coupled to a wind turbine 100. More particularly, illustrated in FIGS. 8 and 9 is another embodiment of the deployable aerodynamic component 130 in a deployed stated, and illustrated in FIGS. 10-11 in a non-deployed state. The deployable aerodynamic component 130 according to FIGS. 8-11 is configured as a weighted cable deployable aerodynamic component 180, and when deployed has a shape generally similar to the umbrella-like aerodynamic component 132 structure previously disclosed, but in contrast is based on a spinning action of the component 180 to deploy and take shape. In this particular embodiment, and as best illustrated in FIG. 8, the weighted cable deployable aerodynamic component 180 is coupled to the wind turbine 100, and more particularly the hub 106 of the wind turbine 100, via a shaft 136, and includes a front portion 182 and a rear portion 184. The weighted cable deployable aerodynamic component 180 when deployed is shaped similar to the deployable aerodynamic component 130, and more particularly the umbrella-like deployable aerodynamic component 132, described with respect to FIGS. 2-4. Therefore, it may have a deployed shape of a substantially spherical segment or a substantially paraboloid shape when viewed from a side, with a maximal outer diameter D of about a diameter of the circle defined by the outer end of the inner portion 124 in operation of the wind turbine 100.

The weighted cable deployable aerodynamic component 180 generally includes a plurality of cables 186, each having a first end extending from a central component 188 at a front portion 182 to a second end proximate the rear portion 184 onto which a weight 190 is coupled. A skin-like covering 134, such as a tensionable fabric is supported by the cables 186. In an embodiment, the skin-like covering 134 is coupled thereto to plurality of cables 186 to allow for deployment. In an alternate embodiment, the skin-like covering 134 is configured to extend between adjacent cables 186, being coupled thereto. In an alternate embodiment, the skin-like covering 134 may extend over the cables 134, being coupled thereto. During deployment, the rear portion 184 may have a substantially circular shape dependent upon a length "L" of each cable 186. In a preferred embodiment, the length "L" is the same for each of the plurality of cables 186. The rear portion 184 of the weighted cable deployable aerodynamic component 180 is formed such that the airfoiled shaped outer portion 122 of each of the plurality of rotor blades 108 is not touching in any pitch angle of the rotor blade 108 the rear portion 164 of the weighted cable deployable aerodynamic component 180. Therefore, the weighted cable deployable aerodynamic component 180 is adapted to provide a low air resistance and to guide the wind 112 toward the airfoiled shaped outer portion 122 of the rotor blades 108 when deployed.

The weighted cable deployable aerodynamic component 180 is deployable via mechanical automation that provides for a spinning action of the central component 188. The spinning action, as indicated in FIG. 9, creates a dynamic structure in front of the plurality of rotor blades 108 due to centrifugal force. When deployed, the weighted cable deployable aerodynamic component 180 provides blockage and redirecting of the incoming wind 112 toward the outer portions 122 of each of the plurality of rotor blades 108, previously described. In addition, the aerodynamic shape of the weighted cable deployable aerodynamic component 180 causes an acceleration in the flow of wind 112 over the more aerodynamically efficient regions of each of the plurality of blades 108.

Figure 10:
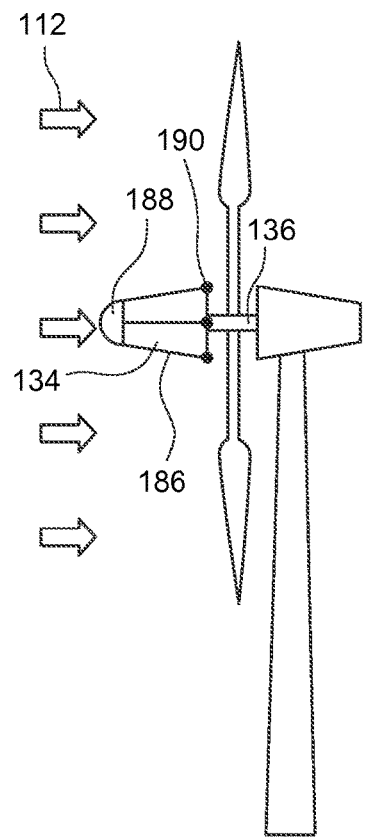
FIG. 10 is a side view of the wind turbine including the deployable aerodynamic component of FIG. 8 in a non-deployed state in accordance with one or more embodiments shown or described herein.
Figure 11:
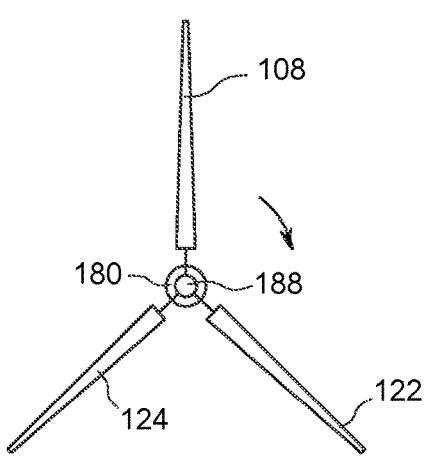
FIG. 11 is a front view of the wind turbine including the deployable aerodynamic component of FIG. 8 in a non-deployed state in accordance with one or more embodiments shown or described herein.

FIGS. 8 and 9 illustrate in a simplified schematic view the weighted cable deployable aerodynamic component 180 when deployed. In a non-deployed state as illustrated in FIGS. 10 and 11, such as during a high wind occurrence, when loading/drag or thrust loads become too great for the weighted cable deployable aerodynamic component 180 to withstand, the spinning action of the central component 188 is stopped and thus the weighted second ends of the cables 186 close about the central shaft 136 to a non-deployed state. In an embodiment, additional cables or means of control may be attached to the second ends of the cables 186, and more particularly each of the weights 190 and to the rotor hub 106 or shaft 136 for additional control during deployment and non-deployment. The aerodynamic shape of the weighted cable deployable aerodynamic component 180 when in the non-deployed stated minimizes any blockage or redirecting of the flow of wind 112 and allows the wind 112 to flow toward the inner portion 124 of the plurality of blades 108 as is typical. In an alternate embodiment, the skin-like structure may be configured to detach from each of the plurality of cables 186 without an immediate requirement to stop the spinning action of the central component 188.

Referring now to FIGS. 12-15, in which like features are designated with the same reference numbers, illustrated is another embodiment of the deployable aerodynamic component 130 coupled to a wind turbine 100. More particularly, illustrated in FIGS. 12 and 13 is another embodiment of the deployable aerodynamic component 130 in a deployed stated, and illustrated in FIGS. 14 and 15 in a non-deployed state. The deployable aerodynamic component 130 according to FIGS. 12-15 is configured as a fluid deployable aerodynamic component 200, and more particularly configured for deployment by inflating with a fluid, such as air. In this particular embodiment, and as best illustrated in FIG. 12, the fluid deployable aerodynamic component 200 is coupled to the wind turbine 100, and more particularly the hub 106 of the wind turbine 100, via a shaft 136, and includes a front portion 202 and a rear portion 204. The fluid deployable aerodynamic component 200 when deployed takes on a dome-like shape as best illustrated in FIG. 12. Therefore, it may have a deployed shape of a substantially spherical segment or a substantially paraboloid shape with a maximal outer diameter D of about the diameter of a circle defined by the outer end of the inner portion 124 in operation of the wind turbine 100.

The fluid deployable aerodynamic component 200 generally includes a skin-like covering 134, such as a fabric that is configured to be inflated with a fluid, such as air. In an embodiment, the skin-like covering 134 is coupled thereto at least one of the hub 106 or shaft 136 to allow for deployment and positioning relative to the wind turbine 100. Included is a means for providing inflation (not shown) to the fluid deployable aerodynamic component 200. During deployment, the rear portion 204 may have a substantially circular shape when viewed in front view. The rear portion 204 of the fluid deployable aerodynamic component 200 is formed such that the airfoiled shaped outer portion 122 of each of the plurality of rotor blades 108 is not touching in any pitch angle of the rotor blade 108 the rear portion 204 of the fluid deployable aerodynamic component 200. Therefore, the fluid deployable aerodynamic component 200 is adapted to provide a low air resistance and to guide the wind 112 toward the airfoiled shaped outer portion 122 of the rotor blades 108 when deployed.

The fluid deployable aerodynamic component 200 is deployable via mechanical automation that provides for inflation of the skin-like covering 134. The inflation of the fluid deployable aerodynamic component 200, as illustrated in FIGS. 12 and 13, creates a dynamic structure in front of the plurality of rotor blades 108. When deployed, the fluid deployable aerodynamic component 200 provides blockage and redirecting of the incoming wind 112 toward the outer portions 122 of each of the plurality of rotor blades 108, previously described. In addition, the aerodynamic shape of the fluid deployable aerodynamic component 200 causes an acceleration in the flow of wind 112 over the more aerodynamically efficient regions of each of the plurality of blades 108.

In a non-deployed state as illustrated in FIGS. 14 and 15, such as during a high wind occurrence, when loading/drag or thrust loads become too great for the fluid deployable aerodynamic component 200 to withstand, the skin-like covering 134 is deflated, and may be packed away in a manner generally similar to a parachute. The aerodynamic shape of the fluid deployable aerodynamic component 200 when in the non-deployed stated minimizes any blockage or redirecting of the flow of wind 112 and allows the wind 112 to flow toward the inner portion 124 of the plurality of blades 108 as is typical. In an alternate embodiment, the skin-like structure may be configured to detach from the wind turbine 100 without an immediate requirement to deflate the skin-like covering 134 and pack it away.

Figure 16:
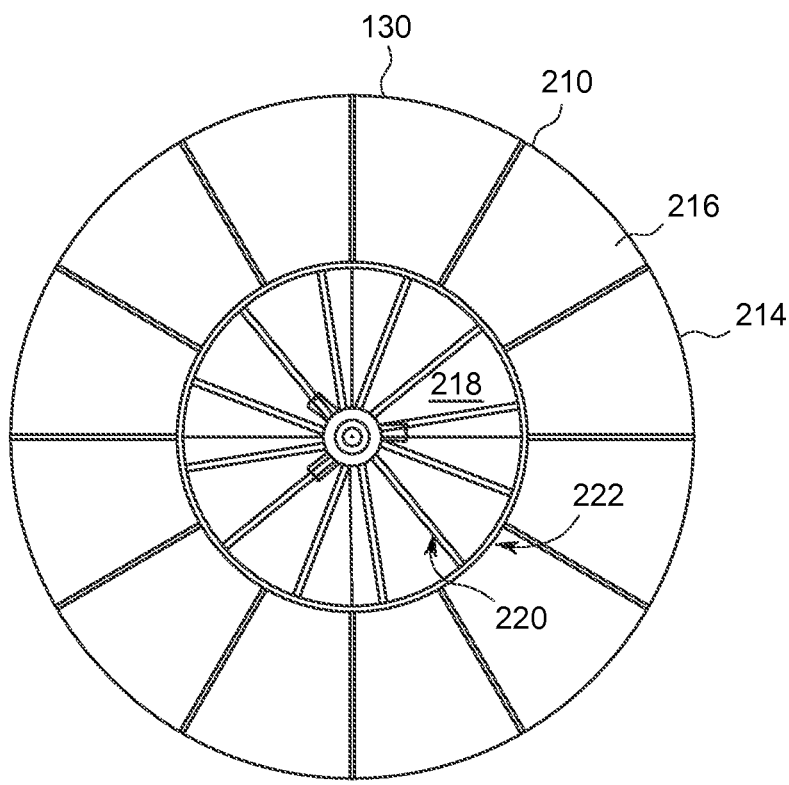
FIG. 16 is a front view of a wind turbine including a deployable aerodynamic component according to an embodiment in a deployed state in accordance with one or more embodiments shown or described herein.
Figure 17:
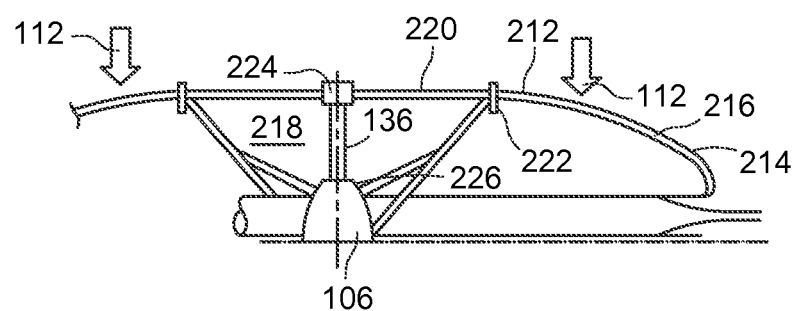
FIG. 17 is a side view of the wind turbine including the deployable aerodynamic component of FIG. 16 in a deployed state in accordance with one or more embodiments shown or described herein.

Referring now to FIGS. 16 and 17, in which like features are designated with the same reference numbers, illustrated is another embodiment of the deployable aerodynamic component 130 coupled to a wind turbine, such as the wind turbine 100 of FIG. 1. More particularly, illustrated in FIGS. 16 and 17 is another embodiment of the deployable aerodynamic component 130 in a deployed state. The deployable aerodynamic component 130 according to FIGS. 16 and 17 is configured as a perimeter paneled deployable aerodynamic component 210, and more particularly configured for deployment by rotating a plurality of panels 216 positioned about a perimeter 214 of the component 210 in a manner to redirect an incoming wind 112. In this particular embodiment, the perimeter paneled deployable aerodynamic component 210 is coupled to the wind turbine, and more particularly the hub 106 of the wind turbine 100, via a shaft 136, and includes a front portion 212. In an embodiment the perimeter paneled deployable aerodynamic component 210 is configured having a substantially dome-like shape with an optional central opening 218 formed therethrough. The perimeter paneled deployable aerodynamic component 210 may have a deployed shape of a substantially spherical segment or a substantially paraboloid shape with a maximal outer diameter of about the diameter of a circle defined by the outer end of the inner portion 124 in operation of the wind turbine 100.

The perimeter paneled deployable aerodynamic component 210 generally includes the plurality of panels 216 spaced about a perimeter 214 of the component 210 and configured to rotate during deployment via a plurality of rotation arms 220 coupled to each of the rotating panels 216 at a first end with a plurality of couplings 222, and to a means for providing rotation 224 as a second end. The component 210 may further include a plurality of secondary rotation arms 226 each coupled at a first end to a panel 216 and to the hub 106 at a second end. In an embodiment, the plurality of secondary rotation arms 226 are provided as an additional support structure to the rotating panels 216 and may be configured to aid in rotation of the rotating panels 216 or simply provide additional support.

The perimeter paneled deployable aerodynamic component 210 is configured such that the airfoiled shaped outer portion 122 (FIG. 1) of each of the plurality of rotor blades 108 (FIG. 1) is not touching the panels 216 of the perimeter paneled deployable aerodynamic component 210 in any pitch angle of the rotor blade 108. During deployment, the panels 216 are rotated via rotation arms 220 and the means for providing rotation 224 in a manner to guide the wind 112 toward the airfoiled shaped outer portion 122 of the rotor blades 108.

As previously indicated, the perimeter paneled deployable aerodynamic component 210 is deployable via mechanical automation that provides for rotation of the panels 216 relative to the incoming wind 112. The rotation of the panels 216, as illustrated in FIGS. 16 and 17, so as to be oriented substantially perpendicular to the direction of the incoming wind 112, creates a dynamic structure in front of the plurality of rotor blades 108. When deployed, the perimeter paneled deployable aerodynamic component 210 provides blockage and redirecting of the incoming wind 112 toward the outer portions 122 of each of the plurality of rotor blades 108, as previously described. In addition, the aerodynamic shape of the perimeter paneled deployable aerodynamic component 210 causes an acceleration in the flow of wind 112 over the more aerodynamically efficient regions of each of the plurality of blades 108.

In a non-deployed state, such as during a high wind occurrence, when loading/drag or thrust loads become too great for the perimeter paneled deployable aerodynamic component 210 to withstand, the panels 216 are rotated by the rotation arms 220 and the means for providing rotation 224 in a direction substantially parallel (not shown) to a direction of an incoming wind 112. The aerodynamics of the perimeter paneled deployable aerodynamic component 210 when in the non-deployed stated minimizes any blockage or redirecting of the flow of wind 112 and allows the wind 112 to flow toward the inner portion 124 of the plurality of blades 108 as is typical.

Figure 18:
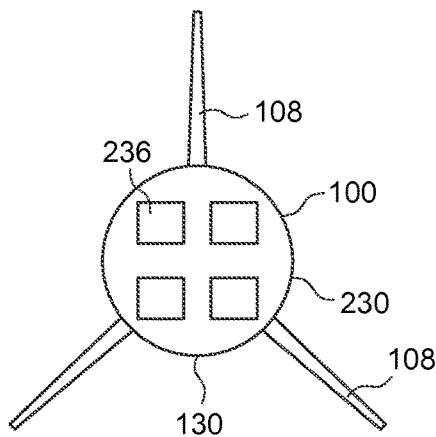
FIG. 18 is a front view of a wind turbine including a deployable aerodynamic component in a deployed state in accordance with one or more embodiments shown or described herein.
Figure 19:
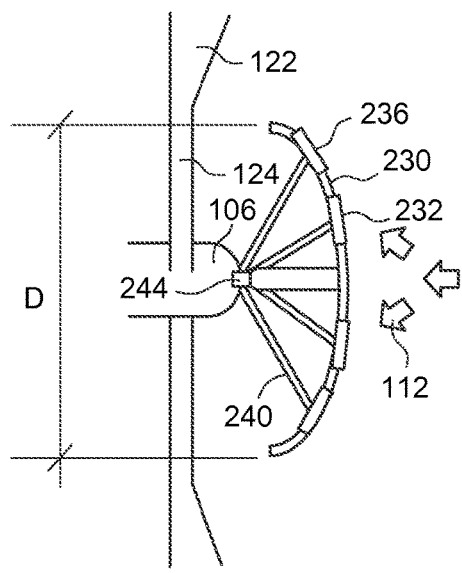
FIG. 19 is a side view of the wind turbine including the deployable aerodynamic component of FIG. 18 in a deployed state in accordance with one or more embodiments shown or described herein.
Figure 20:
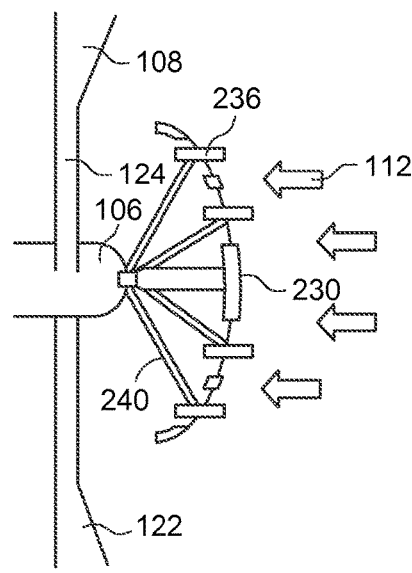
FIG. 20 is a side view of the wind turbine including the deployable aerodynamic component of FIG. 18 in a non-deployed state in accordance with one or more embodiments shown or described herein.

Referring now to FIGS. 18-20, in which like features are designated with the same reference numbers, illustrated is another embodiment of the deployable aerodynamic component 130 coupled to a wind turbine 100. More particularly, illustrated in FIGS. 18 and 19 is another embodiment of the deployable aerodynamic component 130 in a deployed state, and illustrated in FIG. 20 in a non-deployed state. The deployable aerodynamic component 130 according to FIGS. 18-20 is configured as a paneled deployable aerodynamic component 230, generally similar to the perimeter paneled deployable aerodynamic component 210 of FIGS. 15-17, but having a different panel configuration. More particularly, the paneled deployable aerodynamic component 230 is configured having a plurality of panels 236 formed in a front portion 232 of the paneled deployable aerodynamic component 230, in contrast to the perimeter configuration as in the previous embodiment. Although the paneled deployable aerodynamic component 230 is illustrated having four panels 236, it should be understood that the component 230 may be configured to include any number of panels 236 dependent upon design parameters. It is anticipated that at least two panels 236 are required.

The paneled deployable aerodynamic component 230 is configured for deployment by rotating the plurality of panels 216 of the component 210 in a manner to redirect an incoming wind 112 as illustrated in FIG. 19. In this particular embodiment, the paneled deployable aerodynamic component 230 is coupled to the wind turbine 100, and more particularly the hub 106 of the wind turbine 100, via a shaft 136, and includes the front portion 232. In an embodiment the paneled deployable aerodynamic component 230 is configured having a substantially dome-like shape. Although the paneled deployable aerodynamic component 230 is not depicted as including a central opening, such as central opening 218 of the previous embodiment illustrated in FIGS. 16 and 17, it may be included. The paneled deployable aerodynamic component 230 may have a general shape of a substantially spherical segment or a substantially paraboloid shape when viewed from a side with a maximal outer diameter D of about the diameter of a circle defined by the outer end of the inner portion 124 in operation of the wind turbine 100.

The paneled deployable aerodynamic component 230 generally includes the plurality of panels 236 spaced evenly over the front portion 232 of the component 210 and configured to rotate during deployment via a means for providing rotation 244 coupled to each of the rotating panels 236 via a rotation arm 240. In an embodiment, the panels 236 are configured to rotate in a manner similar to that previous described with regard to FIGS. 15-17. The paneled deployable aerodynamic component 230 is configured such that the airfoiled shaped outer portion 122 of each of the plurality of rotor blades 108 is not touching in any pitch angle of the rotor blade 108, the panels 236 of the paneled deployable aerodynamic component 230. During deployment, the panels 236 are rotated in a manner to guide the wind 112 toward the airfoiled shaped outer portion 122 of the rotor blades 108 as illustrated in FIG. 19.

The paneled deployable aerodynamic component 230 is deployable via mechanical automation that provides for rotation of the panels 236 relative to the incoming wind 112. The rotation of the panels 216, as illustrated in FIGS. 18 and 19 substantially perpendicular to the direction of the incoming wind 112, creates a dynamic structure in front of the plurality of rotor blades 108. When deployed, the paneled deployable aerodynamic component 230 provides blockage and redirecting of the incoming wind 112 toward the outer portions 122 of each of the plurality of rotor blades 108, previously described. In addition, the aerodynamic shape of the paneled deployable aerodynamic component 230 causes an acceleration in the flow of wind 112 over the more aerodynamically efficient regions of each of the plurality of blades 108.

In a non-deployed state, such as during a high wind occurrence, when loading/drag or thrust loads become too great for the paneled deployable aerodynamic component 230 to withstand, the panels 236 are rotated in a direction substantially parallel to a direction of an incoming wind 112, such as illustrated in FIG. 20. The aerodynamics of the paneled deployable aerodynamic component 230 when in the non-deployed stated minimizes any blockage or redirecting of the flow of wind 112 and allows the wind 112 to flow toward the inner portion 124 of the plurality of blades 108 as is typical.

FIGS. 21-24, in which like features are designated with the same reference numbers, illustrate another embodiment of the deployable aerodynamic component 130 coupled to a wind turbine 100. More particularly, illustrated in FIGS. 21 and 22 is another embodiment of the deployable aerodynamic component 130 in a deployed state, and illustrated in FIGS. 23 and 24 in a non-deployed state. The deployable aerodynamic component 130 according to FIGS. 21-24 is configured as a rotor flap deployable aerodynamic component 250. More particularly, the rotor flap deployable aerodynamic component 250 is configured having a plurality of rotor flaps or panels 256 that retract or fold away during non-deployment. Although the rotor flap deployable aerodynamic component 250 is illustrated having a specific number of rotor flaps 256, it should be understood that the component 250 may be configured to include any number of rotor flaps 256 dependent upon design parameters. It is anticipated that the rotor flaps 256 are configured in alignment with each of the plurality of rotor blades 108 as illustrated and may fold or retract into each of said rotor blades 108.

The rotor flap deployable aerodynamic component 250 is configured for deployment by an actuation mechanism (not shown) utilizing hydraulics, levers, or the like to unfold or extend the plurality of rotor flaps 256 of the component 250 in a manner to redirect an incoming wind 112 impinging on a front portion 252 as illustrated in FIGS. 21 and 22. In this particular embodiment, the rotor flap deployable aerodynamic component 250 is coupled to the wind turbine 100, and more particularly the hub 106 of the wind turbine 100, via a shaft 136. In an embodiment the rotor flap deployable aerodynamic component 250, and more particularly each of the rotor flaps 256, is configured having a substantially delta-like shape relevant to each rotor blade 108 during a deployed state. In an embodiment the rotor flap deployable aerodynamic component 250, and more particularly the front portion 252 may have a general shape of a substantially spherical segment or a substantially paraboloid shape with a maximal outer diameter D of about the diameter of a circle defined by the outer end of the inner portion 124 in operation of the wind turbine 100 when in a deployed state.

The rotor flap deployable aerodynamic component 250 generally includes the plurality of rotor flaps 256 spaced having a maximal outer diameter D of about the diameter of a circle defined by the outer end of the inner portion 124 of the wind turbine 100. The rotor flaps 256 are configured to extend or unfold during deployment via hydraulics, levers, or other means for accomplishing such. In an embodiment, the rotor flaps 256 are configured such that the airfoiled shaped outer portion 122 of each of the plurality of rotor blades 108 is not touching in any pitch angle of the rotor blade 108, the rotor flaps 256 of the paneled deployable aerodynamic component 250. During deployment, the rotor flaps 256 are deployed in a manner to guide the wind 112 toward the airfoiled shaped outer portion 122 of the rotor blades 108 as illustrated in FIGS. 21 and 22. In an embodiment, it is anticipated that the plurality of rotor flaps 108 may be configured having a "shroud-like" shape to direct the incoming wind 112 in an upward and outward direction toward the airfoiled shaped outer portion 122 of the rotor blades 108.

The rotor flap deployable aerodynamic component 250 is deployable via mechanical automation that provides for extension of the rotor flaps 256 relative to the rotor blades 108. The extending of the rotor flaps 256, as illustrated in FIGS. 21 and 22, from a centerline of each of the rotor blades 108, creates a dynamic structure in front of each of the plurality of rotor blades 108. When deployed, the rotor flap deployable aerodynamic component 250 provides blockage and redirecting of the incoming wind 112 toward the outer portions 122 of each of the plurality of rotor blades 108, as previously described. In addition, the aerodynamic shape of the rotor flap deployable aerodynamic component 250 causes an acceleration in the flow of wind 112 over the more aerodynamically efficient regions of each of the plurality of blades 108.

In a non-deployed state, such as during a high wind occurrence, when loading/drag or thrust loads become too great for the rotor flap deployable aerodynamic component 250 to withstand, the rotor flaps 256 are retracted into the rotor blades 108, such as illustrated in FIGS. 23 and 24. The aerodynamics of the rotor flap deployable aerodynamic component 250 when in the non-deployed stated minimizes any blockage or redirecting of the flow of wind 112 and allows the wind 112 to flow toward the inner portion 124 of the plurality of blades 108, as illustrated in FIG. 23.

Figure 25:
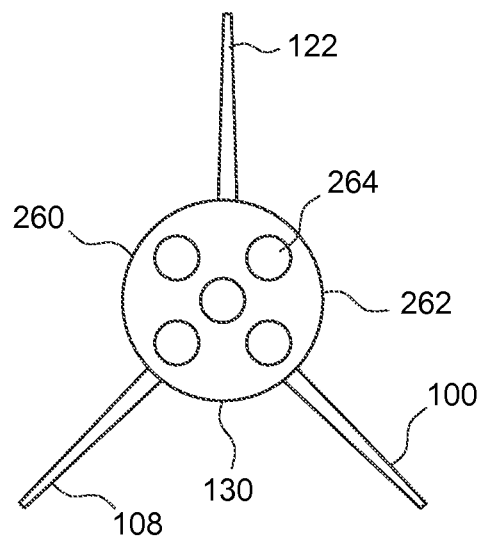
FIG. 25 is a front view of the wind turbine including the deployable aerodynamic component in a deployed state in accordance with one or more embodiments shown or described herein.
Figure 26:
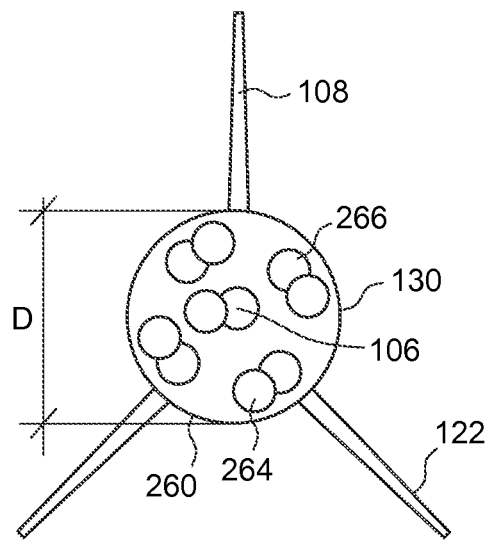
FIG. 26 is a front view of the wind turbine including the deployable aerodynamic component of FIG. 25 in a non-deployed state in accordance with one or more embodiments shown or described herein.

FIGS. 25-29 illustrate a plurality of front views of a plurality of embodiments of a deployable aerodynamic component 130, employing sliding panel deployment features, and configured as a sliding panel deployable aerodynamic component 260. It should be understood that like features are designated with the same reference numbers throughout the figures. More specifically, FIGS. 25-29, illustrate embodiments of the deployable aerodynamic component 130 configured to couple to a wind turbine, such as previously disclosed for the embodiments illustrated in FIGS. 1-24. In particular, illustrated in FIGS. 25 and 26 is an embodiment illustrating a front view of a front portion 262 including a plurality of slideable panels 264, configured to align and misalign with a plurality of flow through openings 266 formed therein the sliding panel deployable aerodynamic component 260. FIG. 25 illustrates the sliding panel deployable aerodynamic component 260 in a deployed state. FIG. 26 illustrates the sliding panel deployable aerodynamic component 260 in a non-deployed state. More particularly, the sliding panel deployable aerodynamic component 260 is configured having a plurality of slideable panels 264 that slide relative to the front portion 262 so as to uncover the flow through openings 266 during non-deployment. Although the sliding panel deployable aerodynamic component 260 is illustrated having a specific number of slideable panels 264, it should be understood that the component 260 may be configured to include any number of slideable panels 264 dependent upon design parameters.

The sliding panel deployable aerodynamic component 260 is configured for deployment by an actuation mechanism (not shown) utilizing hydraulics, levers, or the like to move the slideable panels 264 of the sliding panel deployable aerodynamic component 260 to cover the flow through openings 266 in a manner to redirect an incoming wind 112 as illustrated in FIG. 25. During deployment, the slideable panels 264 are deployed in a manner to guide the wind toward the airfoiled shaped outer portion 122 of the rotor blades 108 as previously described.

The sliding panel deployable aerodynamic component 260 is coupled to the wind turbine 100, and more particularly the hub 106 of the wind turbine 100. In an embodiment the sliding panel deployable aerodynamic component 260, and more particularly the front portion 262 may have a general shape of a substantially spherical segment or a substantially paraboloid shape when viewed from a side, with a maximal outer diameter D of about the diameter of a circle defined by the outer end of the inner portion (not shown) in operation of the wind turbine 100 when in a deployed state.

The sliding panel deployable aerodynamic component 260 is deployable via mechanical automation that provides for sliding of the slideable panels 264 to achieve deployment. The sliding of the panels 264 to cover or block the flow through openings 266, as illustrated in FIG. 25, creates a dynamic structure in front of the plurality of rotor blades 108. When deployed, the sliding panel deployable aerodynamic component 260 provides blockage and redirecting of the incoming wind 112 toward the outer portions 122 of each of the plurality of rotor blades 108, as previously described. In addition, the aerodynamic shape of the sliding panel deployable aerodynamic component 260 causes an acceleration in the flow of wind 112 over the more aerodynamically efficient regions of each of the plurality of blades 108.

In a non-deployed state, such as during a high wind occurrence, when loading/drag or thrust loads become too great for the sliding panel deployable aerodynamic component 260 to withstand, the slideable panels 264 are mechanically actuated to slide and uncover the flow through openings 266, such as illustrated in FIG. 26, so as to allow the flow of wind to pass therethrough. The aerodynamics of the sliding panel deployable aerodynamic component 260 when in the non-deployed state minimizes any blockage or redirecting of the flow of wind and allows the wind to flow toward the inner portion 124 of the plurality of blades 108, as illustrated in FIG. 26.

Figure 27:
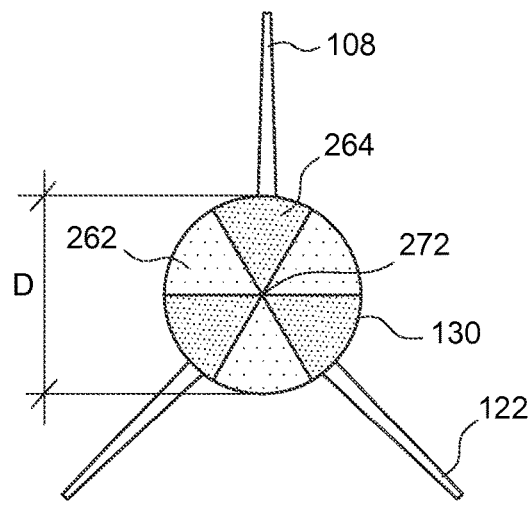
FIG. 27 is a front view of a wind turbine including a deployable aerodynamic component in a deployed state in accordance with one or more embodiments shown or described herein.
Figure 28:
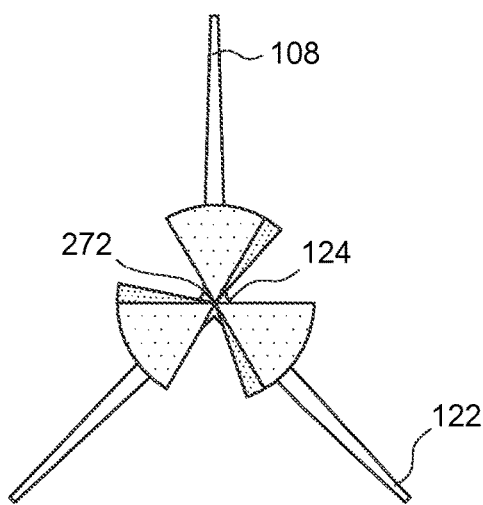
FIG. 28 is a front view of the wind turbine including the deployable aerodynamic component of FIG. 27 in a non-deployed state in accordance with one or more embodiments shown or described herein.
Figure 29:
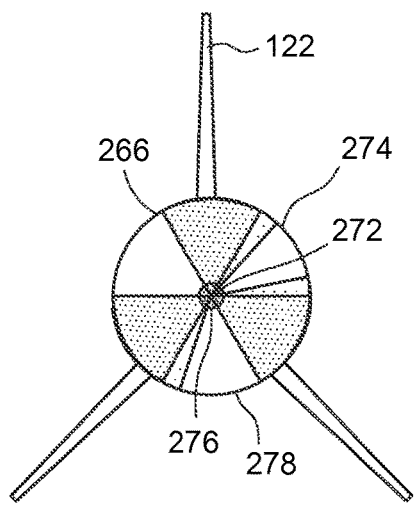
FIG. 29 is a front view of a wind turbine including a deployable aerodynamic component in a non-deployed state in accordance with one or more embodiments shown or described herein.

Referring now to FIGS. 27-29, illustrated are additional configurations for the sliding panel deployable aerodynamic component 260. More particularly, in contrast to the previous embodiment illustrated in FIGS. 25 and 26, the embodiments illustrated in FIGS. 27-29 include a plurality of slideable panels 264, but in this particular embodiment, the panels 264 are pie-shaped and slide or rotate about a central point 272 and in an overlapping configuration when in a non-deployed state. In particular, illustrated in FIGS. 27-29 is an embodiment illustrating a front view of a front portion 262 including a plurality of slideable panels 264, configured to slideably overlap so as to block or unblock a plurality of flow through openings 266. FIG. 27 illustrates the sliding panel deployable aerodynamic component 260 in a deployed state. FIG. 28 illustrates the sliding panel deployable aerodynamic component 260 in a non-deployed state. FIG. 29 illustrates an embodiment of the sliding panel deployable aerodynamic component 260 including a support structure 274 that may be configured to include an inner support ring 276, an outer support ring 278, or both.

The embodiments of the sliding panel deployable aerodynamic component 260 illustrated in FIGS. 27-29 are configured having a plurality of slideable panels 264 that slide relative to the each other so as to form the flow through openings 266 during non-deployment. Although the sliding panel deployable aerodynamic component 260 is illustrated having a specific number of slideable panels 264, it should be understood that the component 260 may be configured to include any number of slideable panels 264 dependent upon design parameters.

The sliding panel deployable aerodynamic component 260 is configured for deployment by an actuation mechanism (not shown) utilizing hydraulics, levers, or the like to move the slideable panels 264 of the sliding panel deployable aerodynamic component 260 to cover the flow through openings 266 in a manner to redirect an incoming wind 112 as illustrated in FIG. 27. During deployment, the slideable panels 264 are deployed in a manner to guide the wind 112 toward the airfoiled shaped outer portion of the rotor blades as previously described.

The sliding panel deployable aerodynamic component 260 is coupled to the wind turbine (not shown), and more particularly the hub (not shown) of the wind turbine. In an embodiment the sliding panel deployable aerodynamic component 260, and more particularly the front portion 262 may have a general shape of a substantially spherical segment or a substantially paraboloid shape with a maximal outer diameter D of about the diameter of a circle defined by the outer end of the inner portion in operation of the wind turbine when in a deployed state.

Similar to the previously disclosed sliding panel embodiment, the sliding panels 264 are deployable via mechanical automation that provides for sliding of the slideable panels 264 to achieve deployment. The sliding of the panels 264 creates a dynamic structure in front of the plurality of rotor blades 108. When deployed, the sliding panel deployable aerodynamic component 260 provides blockage and redirecting of the incoming wind 112 toward the outer portions 122 of each of the plurality of rotor blades 108, as previously described. In addition, the aerodynamic shape of the sliding panel deployable aerodynamic component 260 causes an acceleration in the flow of wind 112 over the more aerodynamically efficient regions of each of the plurality of blades 108.

In a non-deployed state, such as during a high wind occurrence, when loading/drag or thrust loads become too great for the sliding panel deployable aerodynamic component 260 to withstand, the slideable panels 264 are mechanically actuated to slide and form the flow through openings 266, such as illustrated in FIGS. 28 and 29. The aerodynamics of the sliding panel deployable aerodynamic component 260 when in the non-deployed stated minimizes any blockage or redirecting of the flow of wind 112 and allows the wind 112 to flow toward the inner portion 124 of the plurality of blades 108.

Figure 30:
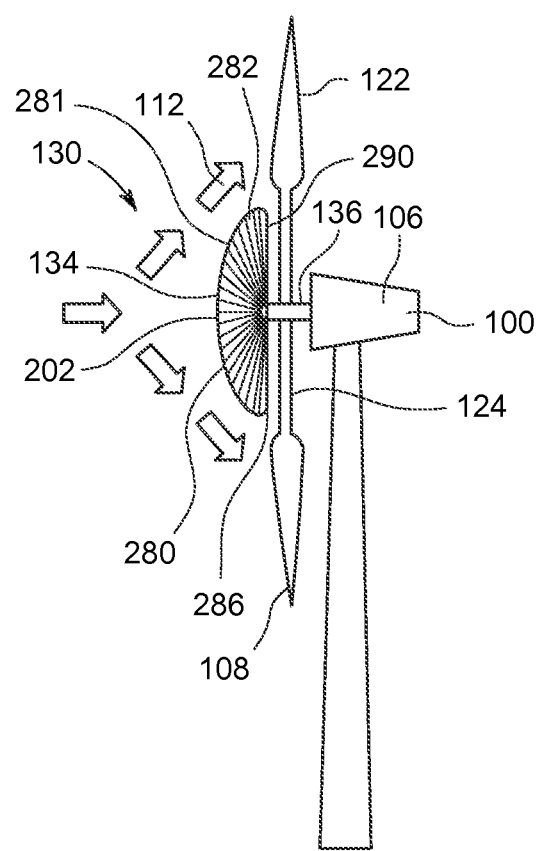
FIG. 30 is a side elevation view of a wind turbine including a deployable aerodynamic component according to an embodiment in a deployed state in accordance with one or more embodiments shown or described herein.
Figure 31:
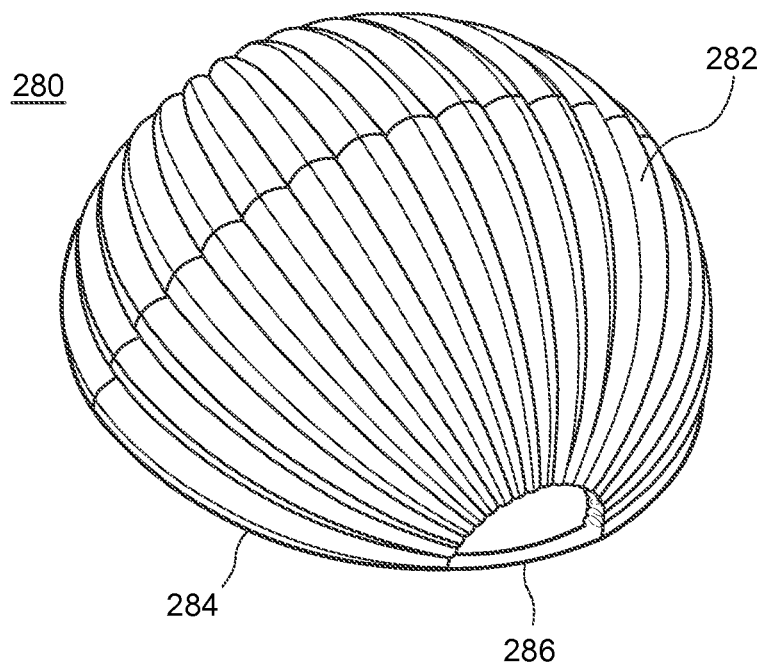
FIG. 31 is an isometric view of a portion of the deployable aerodynamic component of FIG. 30 in a deployed state in accordance with one or more embodiments shown or described herein.
Figure 32:
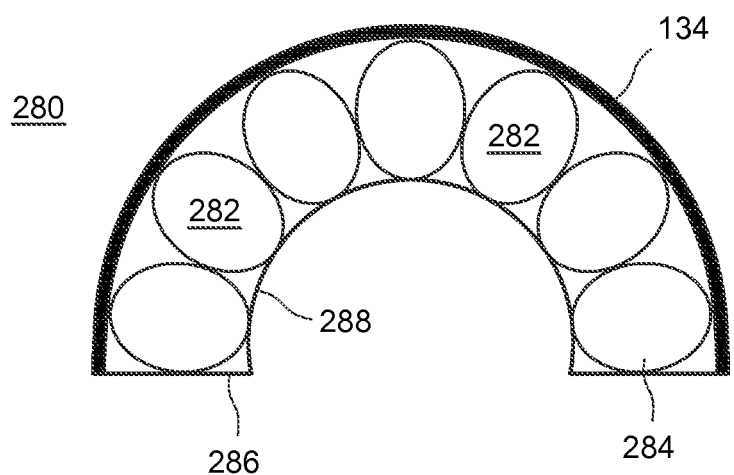
FIG. 32 is a schematic cross-sectional view of the deployable aerodynamic component of FIG. 30 in a deployed state in accordance with one or more embodiments shown or described herein.

Referring now to FIGS. 30-34, in which like features are designated with the same reference numbers, illustrated is another embodiment of the deployable aerodynamic component 130 coupled to a wind turbine 100. More particularly, illustrated in FIGS. 30-32 is another embodiment of the deployable aerodynamic component 130 in a deployed stated (FIG. 31 shown without a covering, presently described), and illustrated in FIGS. 33 and 34 in a non-deployed state. The deployable aerodynamic component 130 according to FIGS. 30-34 is configured as a fluid deployable aerodynamic component 280, and more particularly configured for deployment by inflating a plurality of inflatable nonlinear tubular sections 282 with a fluid, such as air. In this particular embodiment, and as best illustrated in FIG. 30, the fluid deployable aerodynamic component 280 is coupled to the wind turbine 100, and more particularly the hub 106 of the wind turbine 100, via a shaft 136 or other coupling means, and defining a front portion 281. The deployable aerodynamic component 280 includes the plurality of inflatable nonlinear tubular sections 282 and a flexible skin-like covering 134 disposed over and outermost surface of the plurality of inflatable nonlinear tubular sections 282. The fluid deployable aerodynamic component 280 when deployed takes on a dome-like shape as best illustrated in FIG. 30. Therefore, it may have a deployed shape of a substantially spherical segment or a substantially paraboloid shape with a maximal outer diameter D of about the diameter of a circle defined by a ring retainer 286 and upon which a rear section of the outermost 284 plurality of inflatable nonlinear tubular sections 282 may be coupled.

The fluid deployable aerodynamic component 280 generally includes the flexible skin-like covering 134, such as a fabric that is configured to cover the plurality of inflatable nonlinear tubular sections 282. In an embodiment, the flexible skin-like covering 134 is coupled thereto at least one of the outermost tubular sections 284 of the plurality of inflatable nonlinear tubular sections 282 or the ring retainer 286 to allow for deployment and positioning relative to the wind turbine 100. In an embodiment, the plurality of inflatable nonlinear tubular sections 282 are coupled to a parabolic shaped rail 288 configured to provide for movement of the plurality of inflatable nonlinear tubular sections 282 thereon during the process of deployment and non-deployment.

Schematically illustrated in FIG. 31 is the plurality of inflatable nonlinear tubular sections 282 and the ring retainer 286, wherein the flexible skin-like covering 134 has been removed and is not shown. Although each of the plurality of inflatable nonlinear tubular sections 282 are illustrated throughout FIGS. 30-34 as having a substantially elliptical cross-section, as best illustrated in FIG. 32, alternative cross-sectional geometries are anticipated by this disclosure such as circular, triangular, square, rectangular, or the like.

During deployment, the fluid deployable aerodynamic component 280 may have a substantially circular shape when viewed in front view. The fluid deployable aerodynamic component 280 is formed such that the airfoiled shaped outer portion 122 of each of the plurality of rotor blades 108 (as illustrated in FIG. 30) is not touching in any pitch angle of the rotor blade 108, a rear portion 290 of the fluid deployable aerodynamic component 280. Therefore, the fluid deployable aerodynamic component 280 is adapted to provide a low air resistance and to guide the wind 112 toward the airfoiled shaped outer portion 122 of the rotor blades 108 when deployed.

To provide for deployment of the fluid deployable aerodynamic component 280, included is a means for providing inflation (not shown). The fluid deployable aerodynamic component 280 is deployable via mechanical automation that provides for inflation of each of the plurality of inflatable nonlinear tubular sections 282 and positioning substantially taught, the flexible skin-like covering 134 over the plurality of inflatable nonlinear tubular sections 282. In an embodiment the plurality of inflatable nonlinear tubular sections 282, may be inflated using a compressor disposed in either the hub 106 or a blade 108 of the wind turbine 100. After the initial inflation, the compressor may be used if a pressure in one or more of the plurality of inflatable nonlinear tubular sections 282 drops below a desired inflation pressure.

The inflation of the fluid deployable aerodynamic component 280, as illustrated in FIGS. 30-32, creates a dynamic structure in front of the plurality of rotor blades 108. When deployed, the fluid deployable aerodynamic component 280 provides blockage and redirecting of the incoming wind 112 toward the outer portions 122 of each of the plurality of rotor blades 108, as previously described. In addition, the aerodynamic shape of the fluid deployable aerodynamic component 280 causes an acceleration in the flow of wind 112 over the more aerodynamically efficient regions of each of the plurality of blades 108.

Figure 33:
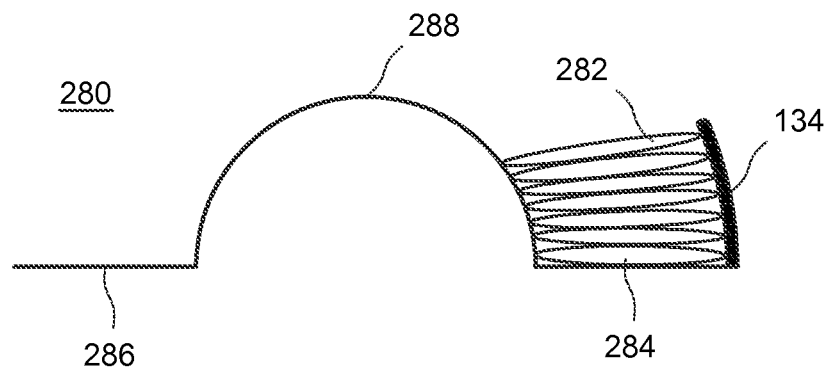
FIG. 33 is a schematic cross-sectional view of the deployable aerodynamic component of FIG. 30 in a non-deployed state in accordance with one or more embodiments shown or described herein.
Figure 34:
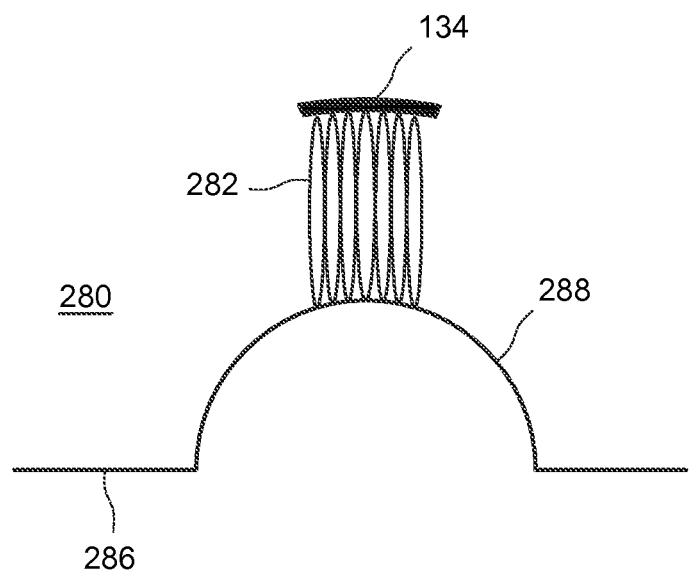
FIG. 34 is a schematic cross-sectional view of the deployable aerodynamic component of FIG. 30 in a non-deployed state in accordance with one or more embodiments shown or described herein.

In a non-deployed state as illustrated in FIGS. 33 and 34, such as during a high wind occurrence, when loading/drag or thrust loads become too great for the fluid deployable aerodynamic component 280 to withstand, the plurality of inflatable nonlinear tubular sections 282 are deflated and positioned in a compacted arrangement relative to one another, and thus allowing the flexible skin-like covering 134 to retract upon itself. As best illustrated in FIG. 33, in an embodiment, the plurality of inflatable nonlinear tubular sections 282 and the flexible skin-like covering 134 may be retracted on to one side of the parabolic shaped rail 288 so as to rest on substantially one side of the ring retainer 286. In an alternate embodiment, the plurality of inflatable nonlinear tubular sections 282 and the skin-like covering 134 may be retracted to a substantially central aspect of the parabolic shaped rail 288. The collapsibility of the fluid deployable aerodynamic component 280 when in the non-deployed state minimizes any blockage or redirecting of the flow of wind 112 and allows the wind 112 to flow toward the inner portion 124 (FIG. 30) of the plurality of blades 108 as is typical. In an alternate embodiment, the fluid deployable aerodynamic component 280 may be configured to detach from the wind turbine 100 for storage.

Figure 35:
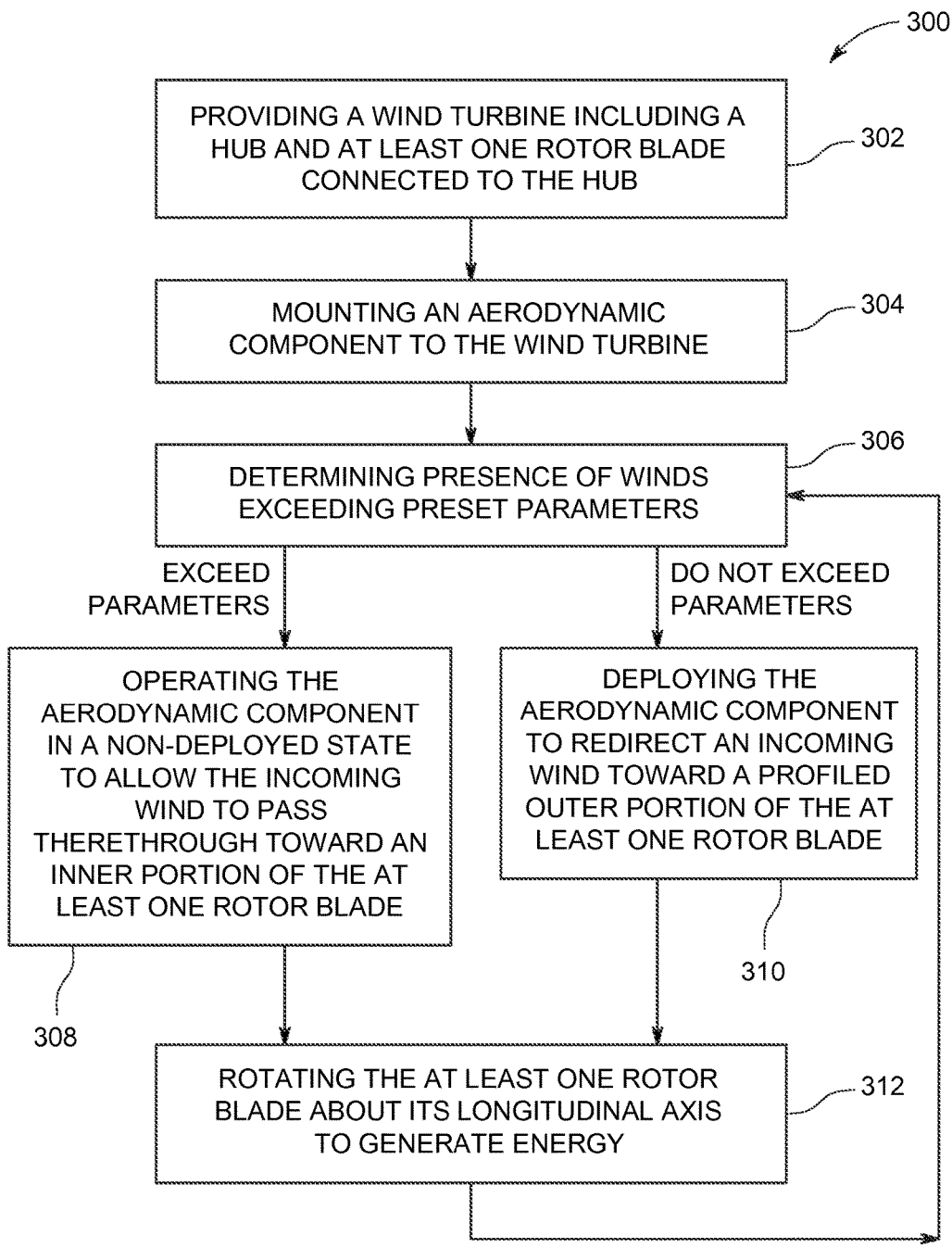
FIG. 35 is a schematic block diagram of method for aerodynamic performance enhancement of a wind turbine in accordance with one or more embodiments shown or described herein.

In FIG. 35 a method for aerodynamic performance enhancement of a wind turbine, thus improving the efficiency of an existing wind turbine is shown at 300. In a first step 302, a wind turbine is provided. The wind turbine includes a hub and at least one rotor blade connected to the hub. The at least one rotor blade has an inner portion and a profiled outer portion as previously described here-above. Next, in step 304, a deployable aerodynamic component is mounted on the hub. The deployable aerodynamic component may be one of the deployable aerodynamic components described here-above. In a further step 306, a determination is made as to the presence of winds exceeding preset parameters. If wind exceed preset parameters, the deployable aerodynamic component operates in a non-deployed state, at step 308, to allow the incoming wind to pass therethrough toward an inner portion of the at least one rotor blade. If wind does not exceed preset parameters, the deployable aerodynamic component is deployed to redirect an incoming wind toward a profiled outer portion of the at least one rotor blade, at step 310 and provide increased efficiency and enhanced aerodynamic performance of the wind turbine. At a step 312, the wind turbine is operated by rotating the at least one rotor blade about its longitudinal axis to generate energy. Step 306 is repeated during operation of the wind turbine to determine the need commence or cease deployment of the deployable aerodynamic component as described in steps 308 and 310.

Disclosed is a deployable aerodynamic component for enhanced aerodynamic performance of a wind turbine. The deployable aerodynamic component having dimensions such that the air impinging the wind turbine at the inner rotor diameter will be guided to profiled rotor blade portions and thus will increase the energy capture of the wind turbine. In a typical embodiment of the deployable aerodynamic component the outer dimensions of the nacelle may be adapted to the deployable aerodynamic component to increase energy capture and to avoid vortex in the down flow wind stream. Therefore the energy capture is increased, and less energy is loss as the air stream at the inner rotor diameter is guided to the profiled rotor blade portions.

The deployable aerodynamic component may be fabricated of any suitable material including, but not limited to stretchable fabric, tensionable fabric, plastic, metal, carbon fiber and/or other construction material. In an embodiment of the deployable aerodynamic component, including an underlying support structure where included, the structure may be fabricated of any suitable material, including, but not limited to carbon fiber and/or other material capable of lending support to the deployable aerodynamic component. In addition, as disclosed here-above, the deployable aerodynamic component may be configured to operate solely when spinning with the rotor blades, such as the weighted cable deployable aerodynamic component 180 described with regard to FIGS. 8-11. In an alternative embodiment, the deployable aerodynamic component may be configured to spin or remain stationary relative to the rotor blades, and is not dependent upon a rotational force to deploy. Embodiments disclosed herein include a deployable aerodynamic component having a substantially dome-shaped configuration when deployed. In alternate embodiments, the dome may not be a full 360 degrees, and may be configured having a "shroud-like" shape to direct the incoming wind in an upward and outward direction toward the airfoiled shaped outer portion of the rotor blades and/or to substantially cover each of the plurality of blades only.

Accordingly, disclosed is an apparatus and method for aerodynamic performance enhancement of a wind turbine configured to operate in a deployed state to redirect an incoming wind toward a profiled outer portion of the at least one rotor blade and in a non-deployed state to allow the incoming wind to pass therethrough toward the inner portion of the at least one rotor blade. It will be understood that the previous apparatus configurations and modes of operation described herein are merely examples of proposed apparatus configurations and operating conditions. What is significant is the apparatus provides for enhanced aerodynamic performance and thus increased efficiency of a wind turbine.

The foregoing has described an apparatus and method for aerodynamic performance enhancement of a wind turbine. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. An aerodynamic component for a wind turbine configured to be mounted to said wind turbine, wherein at least one rotor blade is connected to a hub of said wind turbine and defines an inner portion and a profiled outer portion, the aerodynamic component comprising:
   a front portion configured to be positioned in front of the inner portion of the at least one rotor blade of the wind turbine in operation;
   wherein the aerodynamic component is structurally configured to:
      operate in a deployed state to redirect an incoming wind toward the profiled outer portion of the at least one rotor blade;
      operate in a non-deployed state to allow the incoming wind to flow toward the inner portion of the at least one rotor blade; and
      allow rotation of the at least one rotor blade about its longitudinal axis for pitch angle adjustment of the at least one rotor blade without interfering with the deployment of the aerodynamic component,
   wherein the aerodynamic component is structurally configured as one of:
      a roller and support arc deployable aerodynamic component comprising a frame about which a plurality of support arcs are moveable, a roller coupled to each of the plurality of support arcs and the frame, and a skin-like covering supported by the plurality of support arcs;
      an umbrella-like deployable aerodynamic component comprising a support structure comprised of a skin-like covering, an extension tube, a plurality of spreaders configured to provide immediate support to the skin-like covering, a plurality of secondary supports coupled to the plurality of spreaders and a support structure hub through which the extension tube extends;
      a weighted cable deployable aerodynamic component comprising a plurality of cables, each having a first end extending from a central component at a front portion to a second end proximate a rear portion onto which a weight is coupled and a skin-like covering supported by the plurality of cables to provide deployment in response to a spinning action of the central component;

or a rotor flap deployable aerodynamic component comprising a plurality of rotor flaps, each of the plurality of rotor flaps configured in alignment with and retractable into a rotor blade of the plurality of rotor blades.

2. The aerodynamic component according to claim 1, wherein in a side view, the aerodynamic component has a deployed shape of a substantially spherical segment.

3. The aerodynamic component according to claim 1, wherein in a side view the aerodynamic component has a substantially paraboloidal shape.

4. The aerodynamic component according to claim 1, wherein the aerodynamic component is a nose cone of the hub.

5. The aerodynamic component according to claim 1, wherein at least a portion of the aerodynamic component is configured to detach from the wind turbine.

6. The aerodynamic component according to claim 1, wherein the umbrella-like deployable aerodynamic component further comprises a plurality of power heads proximate the support structure hub providing slideable movement of the support structure hub in a forward and aft direction enabling deployment and retraction of the umbrella-like deployable aerodynamic component.

7. The aerodynamic component according to claim 1, wherein each of the plurality of rotor flaps of the rotor flap deployable aerodynamic component has a delta-like shape in a deployed state relevant to each of the at least one rotor blade.

8. A wind turbine comprising:

a hub;

at least one rotor blade connected to the hub, the rotor blade comprising an inner portion and a profiled outer portion; and a deployable aerodynamic component configured to be mounted to the wind turbine, the deployable aerodynamic component comprising:

a front portion configured to be positioned in front of the inner portion of the at least one rotor blade of the wind turbine in operation;

wherein the deployable aerodynamic component is structurally configured to:

operate in a deployed state to redirect an incoming wind toward the profiled outer portion of the at least one rotor blade;

operate in a non-deployed state to allow the incoming wind to flow toward the inner portion of the at least one rotor blade; and allow rotation of the at least one rotor blade about its longitudinal axis for pitch angle adjustment of the at least one rotor blade without interfering with the deployment of the aerodynamic component, wherein the deployable aerodynamic component is structurally configured as one of:

a roller and support arc deployable aerodynamic component comprising a frame about which a plurality of support arcs are moveable, a roller coupled to each of the plurality of support arcs and the frame, and a skin-like covering supported by the plurality of support arcs;

an umbrella-like deployable aerodynamic component comprising a support structure comprised of a skin-like covering, an extension tube, a plurality of spreaders configured to provide immediate support to the skin-like covering, a plurality of secondary supports coupled to the plurality of spreaders and a support structure hub through which the extension tube extends;

a weighted cable deployable aerodynamic component comprising a plurality of cables, each having a first end extending from a central component at a front portion to a second end proximate a rear portion onto which a weight is coupled and a skin-like covering supported by the plurality of cables to provide deployment in response to a spinning action of the central component;

or a rotor flap deployable aerodynamic component comprising a plurality of rotor flaps, each of the plurality of rotor flaps configured in alignment with and retractable into a rotor blade of the plurality of rotor blades.

9. The wind turbine according to claim 8, wherein the deployable aerodynamic component has a shape of one of a substantially spherical segment or a paraboloidal shape.

10. The wind turbine according to claim 8, wherein the deployable aerodynamic component is configured to detach from the wind turbine.

11. The wind turbine according to claim 8, wherein the deployable umbrella-like aerodynamic component further comprises a plurality of power heads proximate the support structure hub providing slideable movement of the support structure hub in a forward and aft direction enabling deployment and retraction of the umbrella-like deployable aerodynamic component.

12. The wind turbine according to claim 8, wherein each of the plurality of rotor flaps of the rotor flap deployable aerodynamic component has a delta-like shape in a deployed state relevant to each of the at least one rotor blade.

13. The wind turbine according to claim 8, wherein the deployable aerodynamic component is a nose cone of the hub.

14. A method for aerodynamic performance enhancement of a wind turbine comprising:

providing a wind turbine including a hub and at least one rotor blade connected to the hub, the at least one rotor blade having an inner portion and a profiled outer portion;

mounting a deployable aerodynamic component to the wind turbine;

determining the presence of winds exceeding preset parameters;

deploying the deployable aerodynamic component to redirect an incoming wind toward the profiled outer portion of the at least one rotor blade when winds do not exceed the present parameters and operating the deployable aerodynamic component in a non-deployed state to allow the incoming wind to flow toward the inner portion of the at least one rotor blade when winds exceed the present parameters; and rotating the at least one rotor blade about its longitudinal axis to generate energy, wherein the deployable aerodynamic component is structurally configured as one of:

a roller and support arc deployable aerodynamic component comprising a frame about which a plurality of support arcs are moveable, a roller coupled to each of the plurality of support arcs and the frame, and a skin-like covering supported by the plurality of support arcs;

an umbrella-like deployable aerodynamic component comprising a support structure comprised of a skin-like covering, an extension tube, a plurality of spreaders configured to provide immediate support to the skin-like covering, a plurality of secondary supports coupled to the plurality of spreaders and a support structure hub through which the extension tube extends;

a weighted cable deployable aerodynamic component comprising a plurality of cables, each having a first end extending from a central component at a front portion to a second end proximate a rear portion onto which a weight is coupled and a skin-like covering supported by the plurality of cables to provide deployment in response to a spinning action of the central component;

or a rotor flap deployable aerodynamic component comprising a plurality of rotor flaps, each of the plurality of rotor flaps configured in alignment with and retractable into a rotor blade of the plurality of rotor blades.

15. The method according to claim 14, wherein the deployable aerodynamic component has a shape of one of a substantially spherical segment or a paraboloidal shape.

16. The method to claim 14, wherein the deployable aerodynamic component is a nose cone of the hub.

17. The method according to claim 14, wherein the umbrella-like deployable aerodynamic component further comprises a plurality of power heads proximate the support structure hub providing slideable movement of the support structure hub in a forward and aft direction enabling deployment and retraction of the umbrella-like deployable aerodynamic component.

18. The method according to claim 14, wherein each of the plurality of rotor flaps of the rotor flap deployable aerodynamic component has a delta-like shape in a deployed state relevant to each of the at least one rotor blade.

* * * * *